(12) United States Patent
Matsuba

(10) Patent No.: US 8,081,549 B2
(45) Date of Patent: Dec. 20, 2011

(54) INFORMATION RECORDING AND REPRODUCING APPARATUS AND A METHOD OF CONTROLLING AN INFORMATION RECORDING AND REPRODUCING APPARATUS

(75) Inventor: Takanobu Matsuba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1044 days.

(21) Appl. No.: 10/573,835

(22) PCT Filed: Mar. 14, 2006

(86) PCT No.: PCT/JP2006/305468
§ 371 (c)(1),
(2), (4) Date: Jul. 25, 2006

(87) PCT Pub. No.: WO2006/075806
PCT Pub. Date: Jul. 20, 2006

(65) Prior Publication Data
US 2008/0219124 A1 Sep. 11, 2008

(30) Foreign Application Priority Data
Mar. 14, 2005 (JP) .................. 2005-071456

(51) Int. Cl.
*G11B 11/00* (2006.01)
(52) U.S. Cl. .................. 369/53.22; 369/94; 369/275.3; 369/53.23; 369/44.27; 369/59.25
(58) Field of Classification Search .................. 369/94, 369/44.27, 53.22, 30.12, 53.23, 275.3
See application file for complete search history.

(56) References Cited

U.S. PATENT DOCUMENTS

| | | | |
|---|---|---|---|
| 6,317,403 B1 * | 11/2001 | Ono et al. ..................... 369/94 |
| 7,164,640 B2 * | 1/2007 | Sasaki ..................... 369/53.2 |
| 7,248,541 B2 * | 7/2007 | Yonezawa .................. 369/30.12 |
| 2002/0054548 A1 * | 5/2002 | Tateishi ..................... 369/44.27 |
| 2003/0048733 A1 | 3/2003 | Heemskerk |
| 2003/0174624 A1 | 9/2003 | Kobayashi |
| 2003/0202782 A1 | 10/2003 | Motohashi et al. |
| 2005/0030795 A1 | 2/2005 | Matsuba |
| 2005/0036427 A1 | 2/2005 | Suh |
| 2005/0041555 A1 | 2/2005 | Ogawa et al. |
| 2005/0207304 A1 * | 9/2005 | Murotani .................. 369/53.23 |

FOREIGN PATENT DOCUMENTS

EP 1 160 773 A 12/2001

(Continued)

*Primary Examiner* — Lixi C Simpson
(74) *Attorney, Agent, or Firm* — Dickstein Shapiro LLP

(57) ABSTRACT

An information recording and reproducing apparatus records data on and reproduces data from each of a plurality of recording layers of a recording medium. A controller (7) controls a formatting process to format the recording medium (1) by performing a first formatting process on the data area of a recording layer. The first formatting process comprises formatting the data area in a series of recording increments that progress from the inner side of the data area to the outer side of the data area. Within each recording increment the formatting is performed along a path extending from the outer side of the data area to the inner side of the data area. A second formatting process on the data area of another recording layer once the first formatting process has been completed, the second formatting process being performed along a path extending from the inner side of the data area of the other recording layer to the outer side of the data area of the other recording layer.

36 Claims, 16 Drawing Sheets

FOREIGN PATENT DOCUMENTS

| | | |
|---|---|---|
| EP | 1 291 854 A | 3/2003 |
| JP | 2004-288293 A | 10/2004 |
| JP | 2004-303421 A | 10/2004 |
| JP | 2004-342217 A | 12/2004 |
| JP | 2005-093032 A | 4/2005 |
| KR | 10-2000-0031570 | 6/2000 |
| WO | WO-03/105149 A | 12/2003 |

* cited by examiner

US 8,081,549 B2

INFORMATION RECORDING AND REPRODUCING APPARATUS AND A METHOD OF CONTROLLING AN INFORMATION RECORDING AND REPRODUCING APPARATUS

CROSS REFERENCE TO RELATED APPLICATIONS

The present application claims priority from International Application No. PCT/JP2006/305468, the disclosure of which are herewith incorporated by reference in its entirety.

TECHNICAL FIELD

The present invention relates to information recording and reproducing apparatuses and, more particularly, to an information recording and reproducing apparatus which performs recording and reproduction of information on a recordable or rewritable recording medium having a plurality of recording layers.

BACKGROUND ART

There is an information recording and reproducing apparatus that performs a so-called background formatting when, for example, formatting a DVD+RW disc which is a rewritable disc. In the background formatting, a notification of completion of formatting is sent to a host computer at a time when recording is performed on only a part of a lead-in area of the DVD+RW disc, and a remaining area is recorded by dummy data when there is no access request from the host computer. According to the background formatting, a formatting process time is greatly reduced.

Additionally, as another feature of the background formatting, there is an advantage that a disk can be ejected in the middle of a formatting process. At that time, in order to enable reproduction by a conventional reproduction only apparatus, when ejecting a disc in a middle of a formatting process, the disc is ejected after filling an unrecorded area of a data area with dummy data and recording a lead-in area and a lead-out area. Thus, logical compatibility of the disc, which is ejected in the middle of the formatting process, with a DVD-ROM can be maintained.

In recent years, a dual-layer DVD+RW disc (DVD+RW DL (Dual Layer) Disc), which has two recording layers, has been developed as a disc on which a large amount of data can be recorded. Accordingly, there has been developed an information recording and reproducing apparatus, which performs recording and reproduction with respect to the dual-layer DVD+RW disc (for example, refer to Japanese Laid-Open Patent Application No. 2004-303421).

The background formatting is also used for the dual-layer DVD+RW disc, similar to the DVD+RW disc having a single recording layer. That is, a part of a lead-in area is recorded for a request for formatting from a host computer, and a notification of completion of the formatting is sent to the host computer so as to enable an access by the host computer and user data is recorded from a data area of the first layer. Then, while there is no access request from the host computer, remaining areas from the first layer to the second layer are recorded with dummy data. Additionally, eject of the disc in the middle of formatting process is enabled.

However, when ejecting the dual-layer DVD+RW disc in the middle of a formatting process, data is recorded in a temporary middle zone (TMZ) immediately after recording end position of user data of the first layer and the data of the temporary middle zone is recorded immediately after a position corresponding to the user data recording end position in a data area of the second layer, and the disc is ejected after filling an unrecorded part of the data area of the second layer with dummy data so as to maintain compatibility with a DVD-ROM.

FIG. 1 and FIG. 2 are illustrations for explaining a process performed when ejecting a dual-layer DVD+RW disc in the middle of a conventional formatting process.

As shown in FIG. 1, after recording an initial zone 50 of a lead-in area, recording instructed by a host computer is permitted. Then, if a request of ejecting the optical disc is made when the user data 51 is recorded, data 52 of a temporary middle zone is recorded from the end of the recorded position of the user data 51 as shown in FIG. 2, and data 53 of the temporary middle zone is recorded immediately after a position corresponding to the above-mentioned user data recording end position in the second layer. Then, an unrecorded area 54 in the second layer is recorded with dummy data, and, thereafter, the lead-in area 55 and the lead-out area 56 are recorded and, then, the optical disc is ejected.

However, in the conventional information recording and reproducing apparatus, if a last recording position of user data or a format end position of a recording medium having two recording layers, an area in the second layer corresponding to the first recording layer must be recorded with dummy data when a request of ejecting the recording medium is made. Thus, there is a problem that it takes a considerably long time until the recording medium is ejected.

DISCLOSURE OF THE INVENTION

It is a general object of the present invention to provide improved and useful information recording and reproducing apparatus and method in which the above-mentioned problems are eliminated.

A more specific object of the present invention is to provide information recording apparatus and method which can reduce a time to eject a recording medium having a plurality of recording layers in the middle of a formatting process.

In order to achieve the above-mentioned objects, there is provided according to one aspect of the present invention a method for recording information to a recording medium having at least a first recording layer and a second recording layer, the first recording layer having a data area comprising an inner side located at a radially inner region of the recording medium and an outer side located at a radially outer region of the recording medium and the second recording layer comprising a data area including an inner side located at the radially inner region of the recording medium and an outer side located at the radially outer region of the recording medium, the method comprising: performing a first formatting process on the data area of the second recording layer, said first formatting process comprising formatting said data area of the second recording layer in a series of recording increments, the series of recording increments progressing from the inner side of the data area of the second recording layer to the outer side of the data area of the second recording layer, wherein within each recording increment the formatting is performed along a path extending from the outer side of the data area of the second recording layer to the inner side of the data area of the second recording layer; performing a second formatting process on the data area of the first recording layer once the first formatting process has been completed, the second formatting process being performed along a path extending from the inner side of the data area of the first recording layer to the outer side of the data area of the first recording layer.

The recording medium can be a disc-shaped optical recording medium, in which case the radially inner region of the recording medium would be located in the region of the inner periphery of the recording medium, and the radially outer region of the recording medium would be located in the region of the outer periphery of the recording medium. This would also apply to other shapes of recording media.

The first formatting process could occur when there is no request for user data to be read or recording, and when there is no request for the disk to be ejected.

In the above aspect, the formatting within each recording increment the formatting is performed along a path extending from the outer side of the data area of the second recording layer to the inner side of the data area of the second recording layer. In other words, the direction of formatting within each recording increment could be from the outer side of to the inner side of the data area of the second recording layer.

As a result of the features of the above aspect of the invention, the time needed to eject the recording medium having a plurality of recording layers can be reduced when ejecting the recording medium in the middle of a formatting process.

The recording medium may adapted to be recorded by a laser, and the first recording layer may be the recording layer closest the laser during use. The second layer could be the layer the next closest to the laser in use.

The recording medium may be associated with an order of recording user data for each recording layer, and the first recording layer may be arranged to be earlier in the recording order than the second recording layer.

In some embodiments, the method further comprises recording user data on a data area of the first recording layer along a path extending from the inner side of the data area of the first recording layer to the outer side of the data area of the first recording layer on receipt of a request to record user data.

On receiving a request to record user data, the method may comprise recording the user data in priority to the performing the first formatting process or the second formatting process.

The method may further comprise resuming the first formatting process after recording the user data if the first formatting process is not complete. The method may further comprise resuming the second formatting process after recording the user data if the first formatting process is complete.

In some embodiments, the method further comprises: recording predetermined data on the first recording layer at a position immediately after recorded user data on receipt of a request to eject the recording medium.

In some embodiments, the method further comprises: recording predetermined data on the second recording layer at a corresponding radial position to the predetermined data on the first recording layer.

In some embodiments, the method further comprises: recording predetermined data on the second recording layer at the bit inverted addresses to the addresses of the predetermined data on the first recording layer.

On receipt of a request to eject the recording medium, if an end position of the user data on the first recording layer is further in the radially outer direction of the recording medium than an end position of formatted data on the second recording layer, then the method may further comprise: performing a formatting process on the data area of the second recording layer so as to make the radial position of the end position of formatted data on the second recording layer correspond to the radial position of the end position of the user data on the first recording layer.

In some embodiments, the path from the inner side of the data area on the first recording layer to the side of the data area on the first recording layer corresponds to the path from the inner side of the data area on the second recording layer to the side of the data area on the second recording layer. The correspondence could be equivalent radial positions in the recording medium of points in each path. The correspondence could also be that the areas along each path are at bit-inverted addresses. In such embodiments, on receipt of a request to eject the recording medium, if an end position of the user data on the first recording layer is further along the path from the inner side of the data area on the first recording layer to the outer side of the data area on the first recording layer than an end position of formatted data on the second recording layer, then the method may further comprise: performing a formatting process on the data area of the second recording layer so as to make the radial position of the end position of formatted data on the second recording layer correspond to the radial position of the end position of the user data on the first recording layer. Such a formatting process could make the address of the end position of formatted data on the second recording layer be the bit inverted address of the address of the end position of the user data on the first recording layer.

On receipt of a request to eject the recording medium, if an end position of the recording of the user data on the first recording layer is further in the radially outer direction of the recording medium than an end position of formatted data on the second recording layer, then the method may further comprise: performing a formatting process on the data area of the second recording layer so as to make the address of the end position of formatted data on the second recording layer be the bit inverted address of the address of the end position of the user data on the first recording layer.

On receipt of a request to eject the recording medium, the method may further comprise: obtaining a last recorded position of data on said recording medium; recording, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and ejecting said recording medium after recording the predetermined data.

On receipt of a request to eject the recording medium, the method may further comprise: obtaining a last recorded position of data on said recording medium; obtaining a format end position of each recording layer in which the data is not recorded yet; recording dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position; recording predetermined data at a position immediately after the recorded dummy data in each recording layer having said last recorded position of the data, at a position immediately after said format end position in the recording layer having said format end position, and at a position corresponding to said format end position in each recording layer in which data is not recorded yet and formatting has completed; and ejecting said recording medium after recording the predetermined data.

The recording medium may be an optical disk.

According to a second aspect of the invention, there is provided an information recording apparatus arranged to record data on a recording medium having at least a first recording layer and a second recording layer, the first recording layer having a data area comprising an inner side located at a radially inner region of the recording medium and an outer side located at a radially outer region of the recording medium and the second recording layer comprising a data area including an inner side located at the radially inner region of the recording medium and an outer side located at the radially outer region of the recording medium, the apparatus being arranged to: format the data area of the second recording layer of the recording medium according to a first formatting process, said first formatting process comprising formatting said data area of the second recording layer in a series of recording increments, the series of recording increments progressing from the inner side of the data area of the second recording layer to the outer side of the data area of the second recording layer, wherein within each recording increment the formatting is performed along a path extending from the outer side of the data area of the second recording layer to the inner side of the data area of the second recording layer; format a data area of the first recording layer of the recording medium according to a second formatting process once the first formatting process has been completed, the second formatting process being along a path extending from the inner side of the data area of the first recording layer to the outer side of the data area of the first recording layer.

The apparatus may be adapted to record data to the recording medium using a laser, wherein the first recording layer is the recording layer closest the laser during use. The second layer could be the layer the next closest to the laser in use.

The recording medium may be associated with an order of recording user data for each recording layer, and the first recording layer may be arranged to be earlier in the recording order than the second recording layer.

The apparatus may be further arranged to record user data on a data area of the first recording layer along a path extending from the inner side of the data area of the first recording layer to the outer side of the data area of the first recording layer on receipt of a request to record user data.

On receipt of a request to record user data, the apparatus may be further arranged to record the user data in priority to the performing the first formatting process.

The apparatus may be further arranged to resume performing the first formatting process after recording the user data if the first formatting process is not complete.

In some embodiments, the apparatus is further arranged to resume performing the second formatting process after recording the user data if the first formatting process is complete.

The apparatus may be further arranged to record predetermined data on the first recording layer at a position immediately after recorded user data on receipt of a request to eject the recording medium.

The apparatus may be further arranged to record predetermined data on the second recording layer at a corresponding radial position to the predetermined data on the first recording layer.

The apparatus may be further arranged to record predetermined data on the second recording layer at the bit inverted addresses to the addresses of the predetermined data on the first recording layer.

On receipt of a request to eject the recording medium, if an end position of the recording of the user data on the first recording layer is further in the radially outer direction of the recording medium than an end position of formatted data on the second recording layer, then the apparatus is further arranged to:

format the data area of the second recording layer so as to make the radial position of the end position of formatted data on the second recording layer correspond to the radial position of the end position of the user data on the first recording layer.

On receipt of a request to eject the recording medium, if an end position of the recording of the user data on the first recording layer is further in the radially outer direction of the recording medium than an end position of formatted data on the second recording layer, then the apparatus is further arranged to: format the data area of the second recording layer so as to make the address of the end position of formatted data on the second recording layer be the bit inverted address to the address of the end position of the user data on the first recording layer.

On receipt of a request to eject the recording medium, the apparatus may be adapted to: obtain a last recorded position of data on said recording medium; record, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and eject said recording medium after recording the predetermined data.

On receipt of a request to eject the recording medium, the apparatus may be adapted to: obtain a last recorded position of data on said recording medium; obtain a format end position of each recording layer in which the data is not recorded yet; record dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position; record predetermined data at a position immediately after the recorded dummy data in each recording layer having said last recorded position of the data, at a position immediately after said format end position in the recording layer having said format end position, and at a position corresponding to said format end position in each recording layer in which data is not recorded yet and formatting has completed; and eject said recording medium after recording the predetermined data.

The recording medium may be an optical disk.

According to a third aspect of the invention, there is provided an information recording and reproducing apparatus configured and arranged to record data on and reproduce data from each of a plurality of recording layers of a recording medium, comprising: a controller that controls a formatting process to format said recording medium by starting from one of the recording layers of which recording order of data is latest and progressing the formatting from one of the recording layers of which the recording order is later toward one of the recording layers of which the recording order is earlier.

In the information recording and reproducing apparatus according to the present invention the recording medium may be an optical disc, and the controller may control to start the formatting process of each of the recording layers from an inner side of said optical disc.

In the information recording and reproducing apparatus according to the present invention, the controller may control an eject process to eject the recording medium from the information recording and reproducing apparatus so as to obtain a last recorded position of data on the recording medium when an instruction of ejecting said recording medium is made; record, when formatting has been completed to a position of each recording layer corresponding to the last recorded area, predetermined data at a position immediately after the last recorded position in the recording layer having the last recorded position and at a position immediately after a position corresponding to the last recorded position in each recording layer in which the data is not recorded; and eject the recording medium after recording the predetermined data.

In the information recording and reproducing apparatus according to the present invention, the controller may control an eject process to eject the recording medium from the information recording and reproducing apparatus so as to obtain a last recorded position of data on the recording medium when an instruction of ejecting the recording medium is made; obtain a format end position of each recording layer in which the data is not recorded yet; record dummy data, when an area from the last recorded position to a position corresponding to the format end position is an unrecorded area with respect to one of the recording layers having the last recorded position of the data in accordance with the last recorded position and the format end position, the dummy data being recorded in the area from the last recorded position to the position corresponding to the format end position; record predetermined data at a position immediately after the recorded dummy data in each the recording layer having the last recorded position of the data, at a position immediately after the format end position in the recording layer having the format end position, and at a position corresponding to the format end position in each recording layer in which data is not recorded yet and formatting has completed; and eject the recording medium after recording the predetermined data.

Additionally, there is provided according to another aspect of the present invention an information recording and reproducing apparatus configured and arranged to record data on and reproduce data from each of a plurality of recording layers of a recording medium, comprising: formatting means for formatting said recording medium by starting from one of the recording layers of which recording order of data is latest and progressing the formatting from one of the recording layers of which the recording order is later toward one of the recording layers of which the recording order is earlier.

In the information recording and reproducing apparatus according to the above-mentioned invention, the recording medium may be an optical disc, and the formatting means may include means for starting the formatting of each of the recording layers from an inner side of said optical disc.

The information recording and reproducing apparatus according to the above-mentioned invention may further comprise: means for obtaining a last recorded position of data on the recording medium when an instruction of ejecting the recording medium is made; means for recording, when formatting has been completed to a position of each recording layer corresponding to the last recorded area, predetermined data at a position immediately after the last recorded position in the recording layer having the last recorded position and at a position immediately after a position corresponding to the last recorded position in each recording layer in which the data is not recorded; and means for ejecting the recording medium after recording the predetermined data.

The information recording and reproducing apparatus according to the above-mentioned invention may further comprise: means for obtaining a last recorded position of data on the recording medium when an instruction of ejecting said recording medium is made; means for obtaining a format end position of each recording layer in which the data is not recorded yet; means for recording dummy data, when an area from the last recorded position to a position corresponding to the format end position is an unrecorded area with respect to one of the recording layers having the last recorded position of the data in accordance with the last recorded position and the format end position, the dummy data being recorded in the area from the last recorded position to the position corresponding to the format end position;

means for recording predetermined data at a position immediately after the recorded dummy data in each the recording layer having the last recorded position of the data, at a position immediately after the format end position in the recording layer having the format end position, and at a position corresponding to said format end position in each recording layer in which data is not recorded yet and formatting has completed; and means for ejecting the recording medium after recording the predetermined data.

Further, there is provided according to another aspect of the present invention a method of controlling an information recording and reproducing apparatus configured and arranged to record data on and reproduce data from each of a plurality of recording layers of a recording medium, the method comprising: a formatting step of formatting the recording medium by starting from one of the recording layers of which recording order of data is latest and progressing the formatting from one of the recording layers of which the recording order is later toward one of the recording layers of which the recording order is earlier.

In the method of controlling an information recording and reproducing apparatus according to the present invention, the recording medium may be an optical disc, and the formatting step may include a step of starting the formatting of each of the recording layers from an inner side of the optical disc.

The method of controlling an information recording and reproducing apparatus according to the present invention may further comprise: a step of obtaining a last recorded position of data on the recording medium when an instruction of ejecting the recording medium is made; a step of recording, when formatting has been completed to a position of each recording layer corresponding to the last recorded area, predetermined data at a position immediately after the last recorded position in the recording layer having the last recorded position and at a position immediately after a position corresponding to the last recorded position in each recording layer in which the data is not recorded; and a step of ejecting the recording medium after recording the predetermined data.

The method of controlling an information recording and reproducing apparatus according to the present invention may further comprise: a step of obtaining a last recorded position of data on the recording medium when an instruction of ejecting the recording medium is made; a step of obtaining a format end position of each recording layer in which the data is not recorded yet; a step of recording dummy data, when an area from the last recorded position to a position corresponding to the format end position is an unrecorded area with respect to one of the recording layers having the last recorded position of the data in accordance with the last recorded position and the format end position, the dummy data being recorded in the area from the last recorded position to the position corresponding to the format end position; a step of recording predetermined data at a position immediately after the recorded dummy data in each the recording layer having the last recorded position of the data, at a position immediately after the format end position in the recording layer having the format end position, and at a position corresponding to the format end position in each recording layer in which data is not recorded yet and formatting has completed; and a step of ejecting the recording medium after recording the predetermined data.

According to the above-mentioned aspects of the invention, a time spent on ejecting the recording medium having a plurality of recording layers can be reduced when ejecting the recording medium in the middle of a formatting process.

Other objects, features and advantages of the present invention will become more apparent from the following detailed description when read in conjunction with the accompanying drawings.

BEST MODE FOR CARRYING OUT THE INVENTION

A description will now be given, with reference to the drawings, of embodiments according to the present invention.

Figure 1:
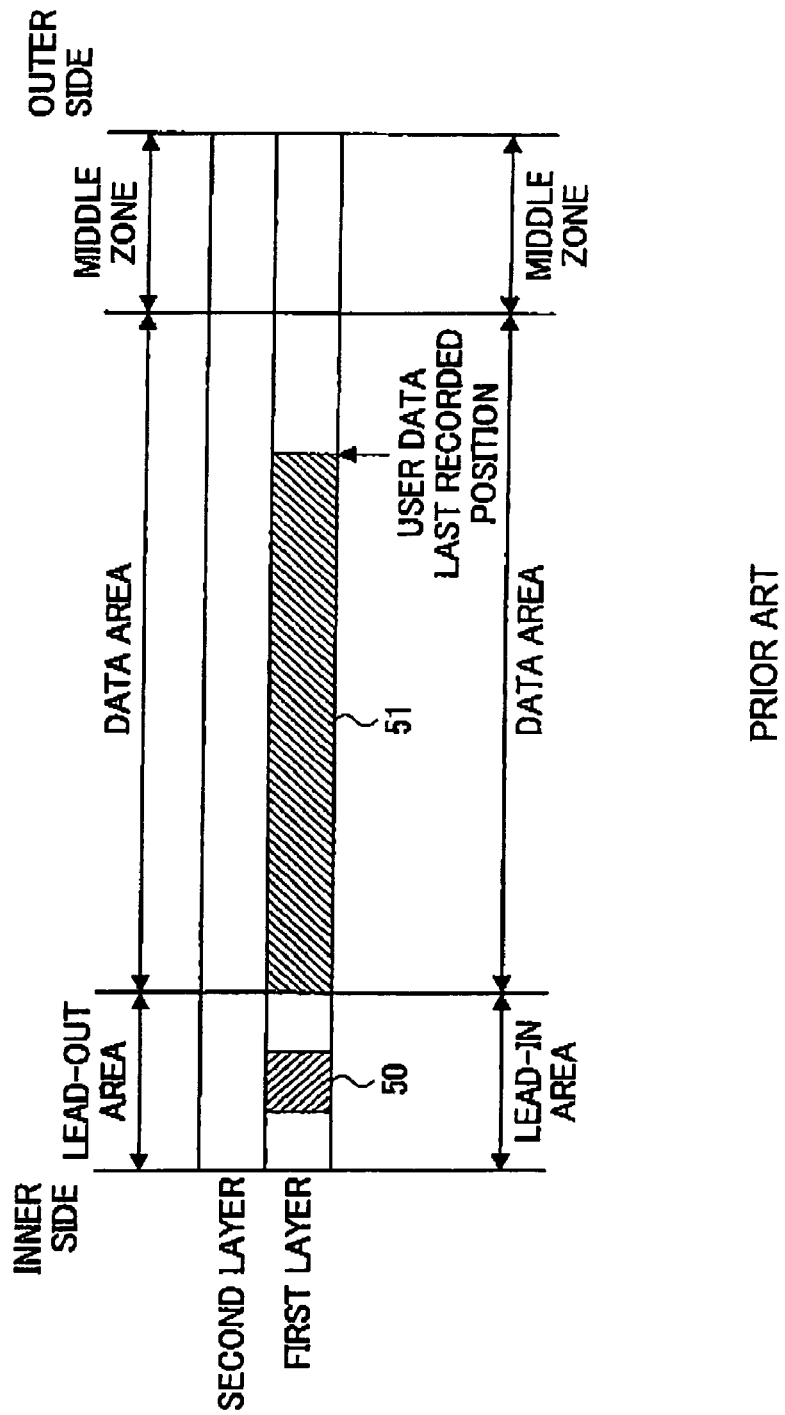
FIG. 1 is an illustration for explaining a process performed when ejecting a dual-layer DVD+RW disc in the middle of a conventional formatting process.
Figure 2:
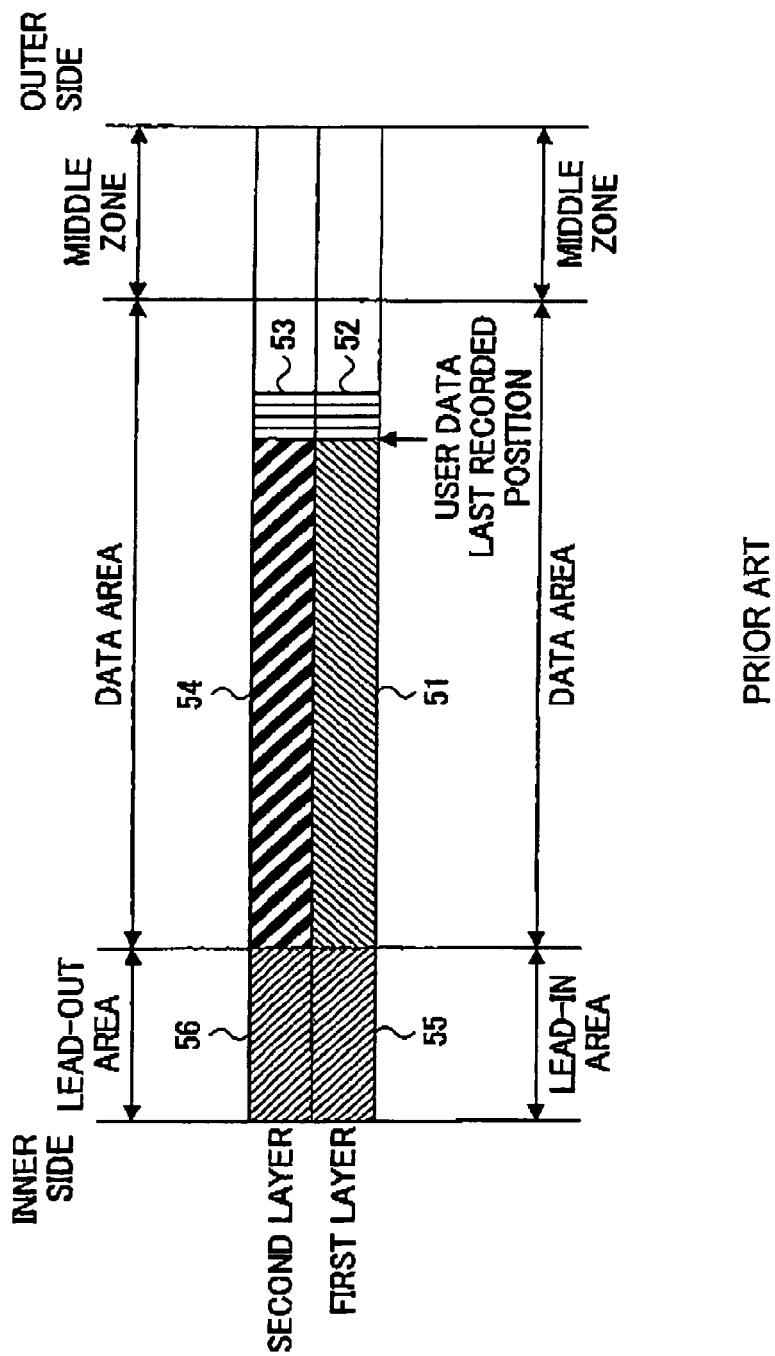
FIG. 2 is an illustration for explaining a process performed when ejecting a dual-layer DVD+RW disc in the middle of a conventional formatting process.
Figure 3:
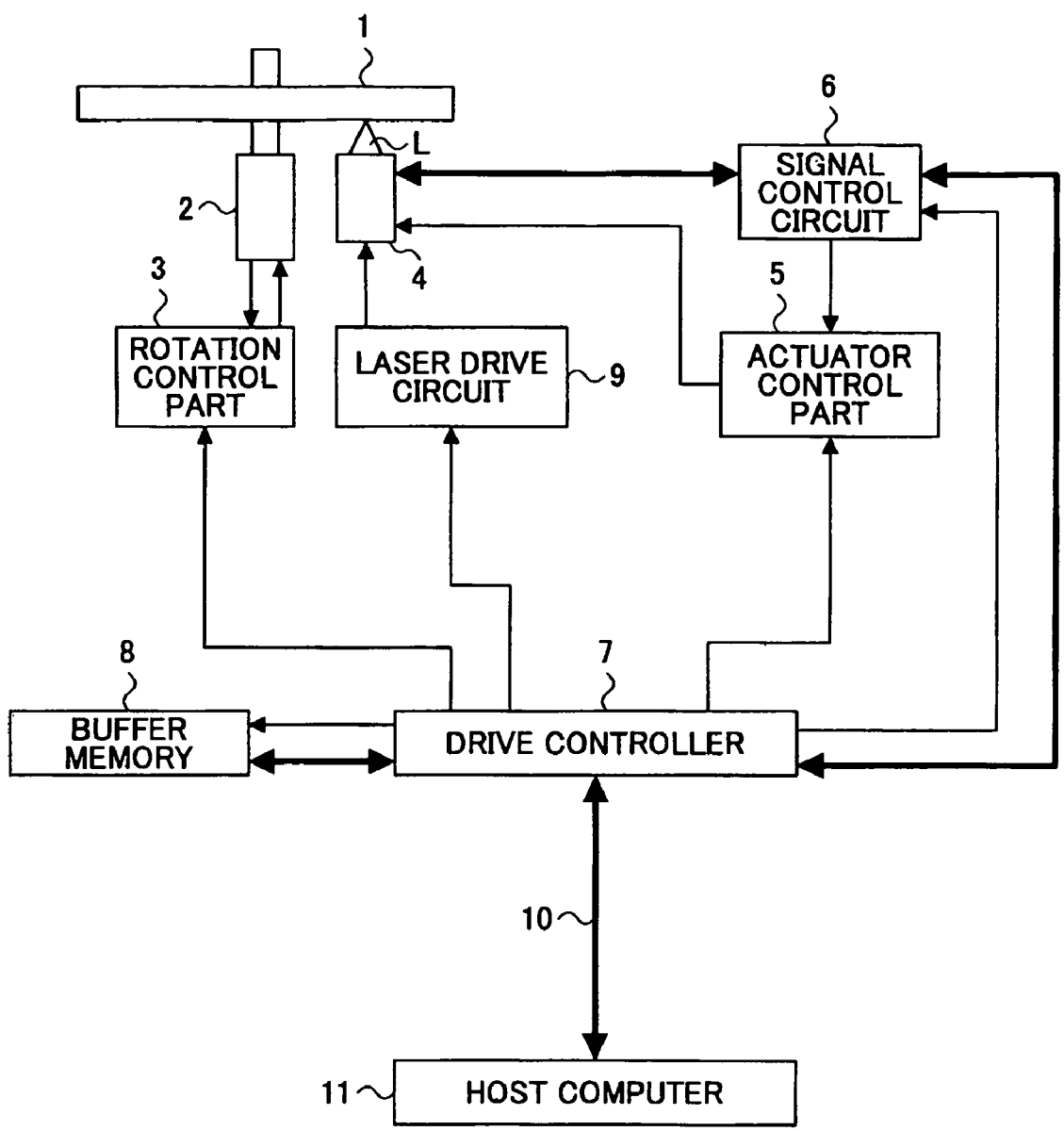
FIG. 3 is a block diagram of an information recording and reproducing apparatus according to first through fourth embodiments of the present invention.

FIG. 3 is a block diagram of an information recording and reproducing apparatus according to first through fourth embodiments of the present invention. In FIG. 3, an optical disc 1 is a recording medium having a plurality of recording layers. In the embodiments, the disc 1 is a recordable recording medium having two recording layers that includes a dual-layer DVD+RW disc. The information recording and reproducing apparatus is an optical disc apparatus that performs recording and reproduction with respect to the optical disc 1 having the two recording layers.

A spindle motor 2 is a motor for rotating the optical disc 1 at predetermined rotation speeds when recording and reproducing data, respectively. A rotation control part 3 controls rotation of the motor 2. An optical pickup 4 is a device that emits and irradiates a laser light L at a predetermined recording power when recording data on the optical disc 1 or reproducing data from the optical disc 1. An actuator control part 5 controls to move the optical pickup 4 when performing focusing and tracking on the optical disc 1. A signal control part 6 controls a reproduction signal output from the optical pickup 4 and a recording signal output to the optical pickup 4.

A drive controller 7 is achieved by a microcomputer comprising a CPU, a ROM, a RAM, etc. The drive controller 7 controls the entire information recording and reproducing apparatus, and also performs a function of means including formatting means according to the present invention. A buffer memory 8 is a memory used as a temporarily storage area that is used by the drive controller 7 to store data. A laser drive circuit 9 drives a laser of the optical pickup 4 to emit the laser light L. An external interface 10 is used for transmitting/receiving commands and data to/from a host computer 11. The host computer 11 incorporates therein a control part that is realized by a microcomputer comprising a CPU, a ROM, a RAM, etc. The host computer 11 is an information processing apparatus such as a personal computer that controls the information recording and reproducing apparatus.

First Embodiment

In a first embodiment of the present invention, the drive controller 7 controls a formatting process performed on the optical disc 1 so that the formatting process is started from a second layer of which turn of recording is last and the formatting is progressed to a first recording layer of which turn of recording is earlier than the first recording layer.

Figure 4:
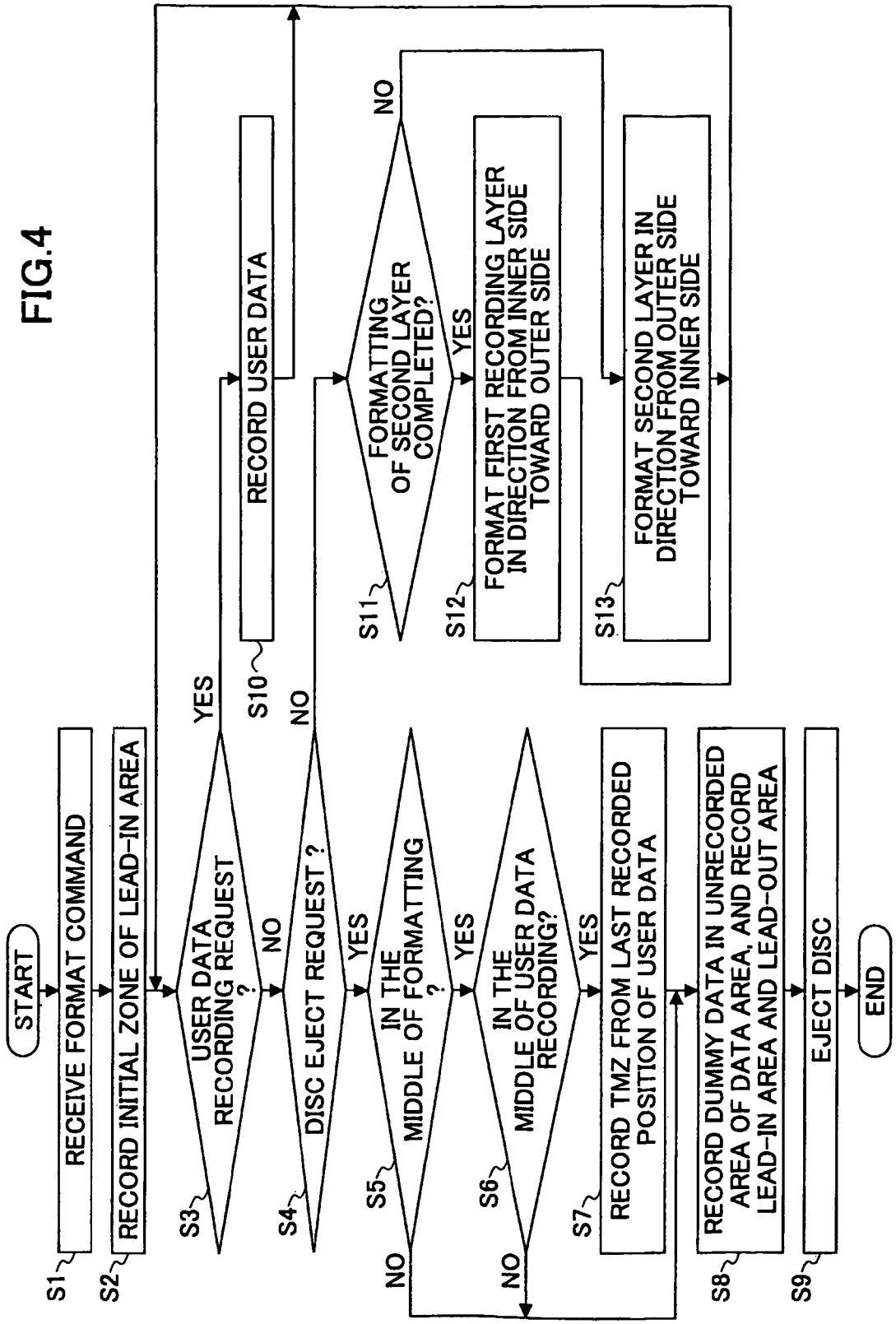
FIG. 4 is a flowchart of a disc eject process according to the first embodiment of the present invention performed in the information recording and reproducing apparatus shown in FIG. 3.

FIG. 4 is a flowchart of a disc eject process according to the first embodiment of the present invention performed in the information recording and reproducing apparatus shown in FIG. 3.

Upon receipt of a format command from the host computer 11 in step S1, the drive controller 7 records, in step S2, a zone of a lead-in area of the first recording layer of the optical disc 1, and sends a notification of completion of formatting process to the host computer 1 and receives a disc access request from the host computer 1.

The drive controller 7 determines whether there is a user data recording request from the host computer 1. If it is determined in step S3 that there is a user data recording request from the host computer 1, the routine proceeds to step S10 so as to records user data received from the host computer 1 from a data area of the first recording layer. When the entire data area of the first recording layer has been recorded, recording is performed on a data area of the second recording layer. The data recording in the data area of the first recording layer is performed in a direction from an inner side to an outer side of the optical disc 1, and the data recording in the data area of the second recording layer is performed in a direction from the outer side to the inner side of the optical disc 1. If it is determined, in step S3, that there is no user data recording request, it is determined, in step S4, whether or not there is a disc eject request from the host computer 1.

If it is determined, in step S4, that there is no disc eject request from the host computer 1, the routine proceeds to step S11 where it is determined whether or not the formatting process of the data area of the second recording layer has been completed. If it is determined, in step S11, that the formatting process of the data area of the second recording layer has been completed, the routine proceeds to step S12. In step S12, a formatting process of the recording area of the first recording layer is started so as to record data in a direction from the inner side to the outer side of the optical disc 1, and the routine returns to step S3. If it is determined in step S11 that the formatting process of the data area of the second recording layer has not been completed, the routine proceeds to step S13. In step S13, a formatting process of the recording area of the second recording layer is started so as to record data in a direction from the outer side to the inner side of the optical disc 1, and the routine returns to step S3. On the other hand, if it is determined in step S4 that there is a disc eject request from the host computer 1, the routine proceeds to step S5 so as to determine whether or not it is in the middle of formatting (in background). The middle of formatting mentioned here does not mean a state where a formatting process is performed when a determination is made but means a state where a formatting process has not been completed over an entire data area.

If it is determined, in step S5, that it is not in the middle of formatting, the routine proceeds to step S8. In step S8, dummy data is recorded in an unrecorded recording area of the data area and the lead-in area and the lead-out area are recorded. Then, in step S9, the optical disc 1 is ejected, and the process at this time is ended. If it is determined, in step S5, that it is in the middle of formatting, it is determined, in step S6, whether or not it is in the middle of recording of user data. The middle of recording of user data mentioned here does not mean a state where a user data recording is performed when a determination is made but means a state where a user data recording process has not been completed over an entire area which has not been subjected to a formatting process among the data areas.

If it is determined, in step S6, that it is in the middle of the user data recording, the routine proceeds to step S7. In step S7, data of the temporary middle zone (TMZ) is recorded from the last recorded position of the user data. Then, in step S8, dummy data is recorded in an unrecorded area of the data area and the lead-in area and the lead-out area are recorded. Then, in step S9, the optical disc 1 is ejected, and the process at this time is ended.

Figure 5:
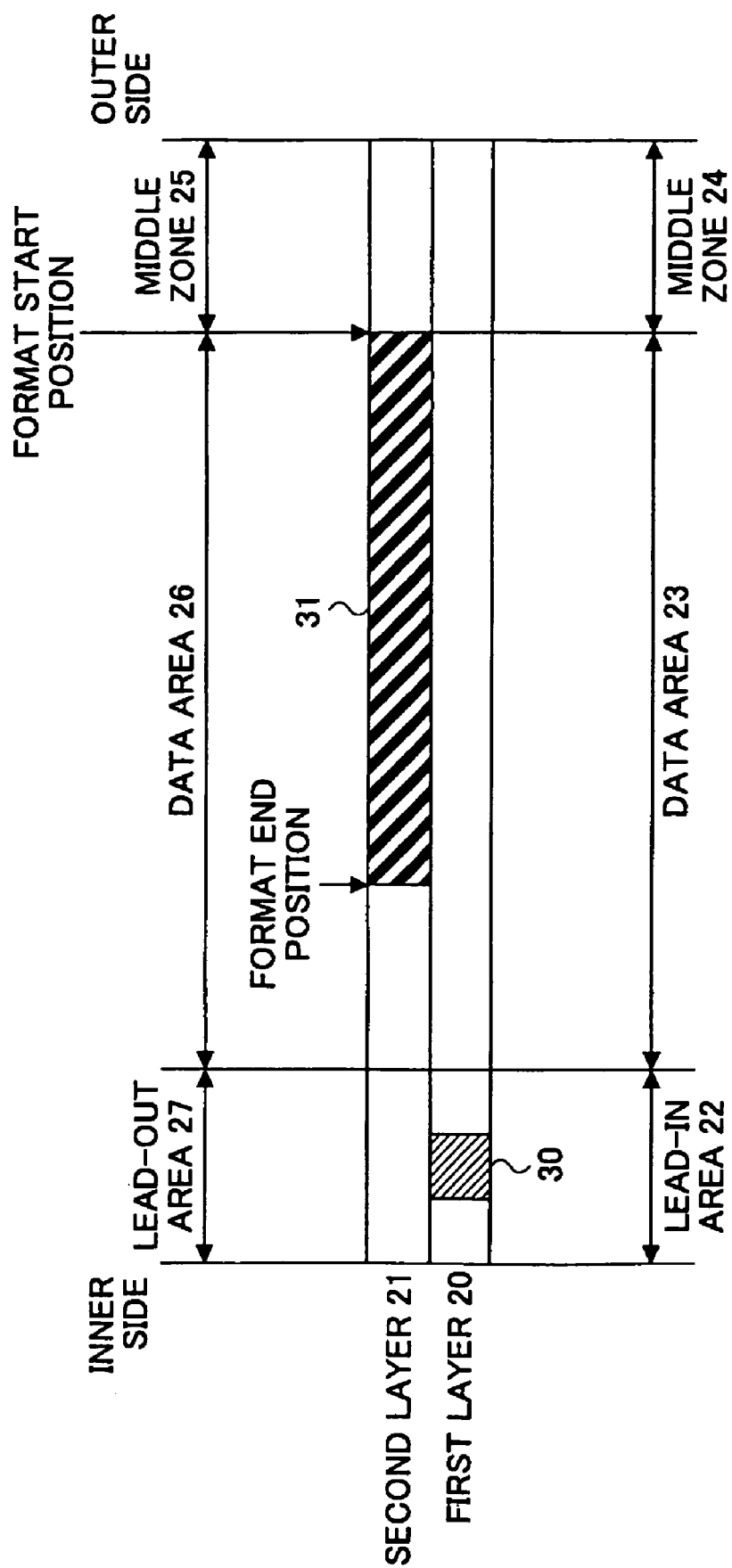
FIG. 5 is an illustration for explaining a disc eject process according to the first embodiment of the present invention performed in the information recording and reproducing apparatus shown in FIG. 3.
Figure 6:
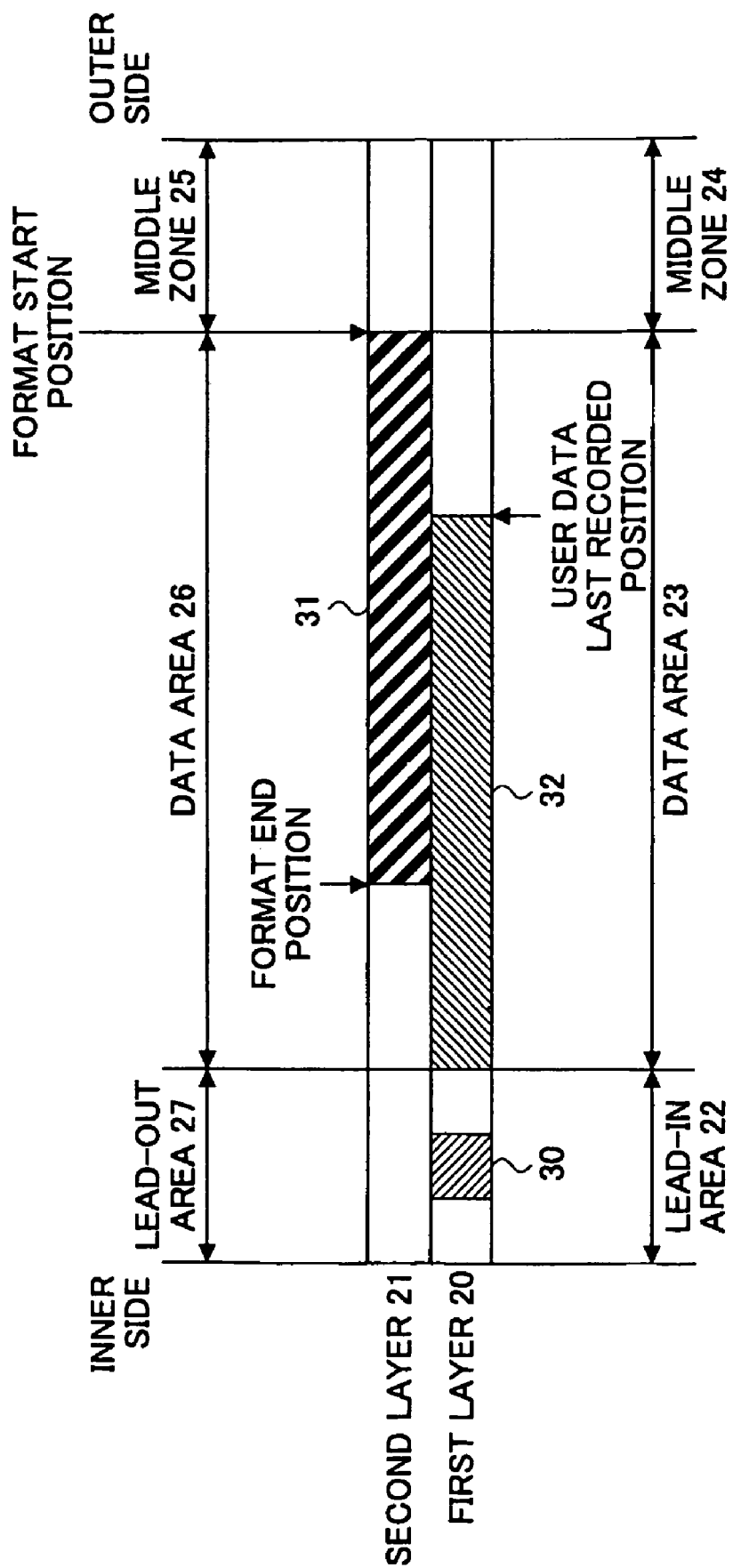
FIG. 6 is an illustration for explaining the disc eject process according to the first embodiment of the present invention performed in the information recording and reproducing apparatus shown in FIG. 3.
Figure 7:
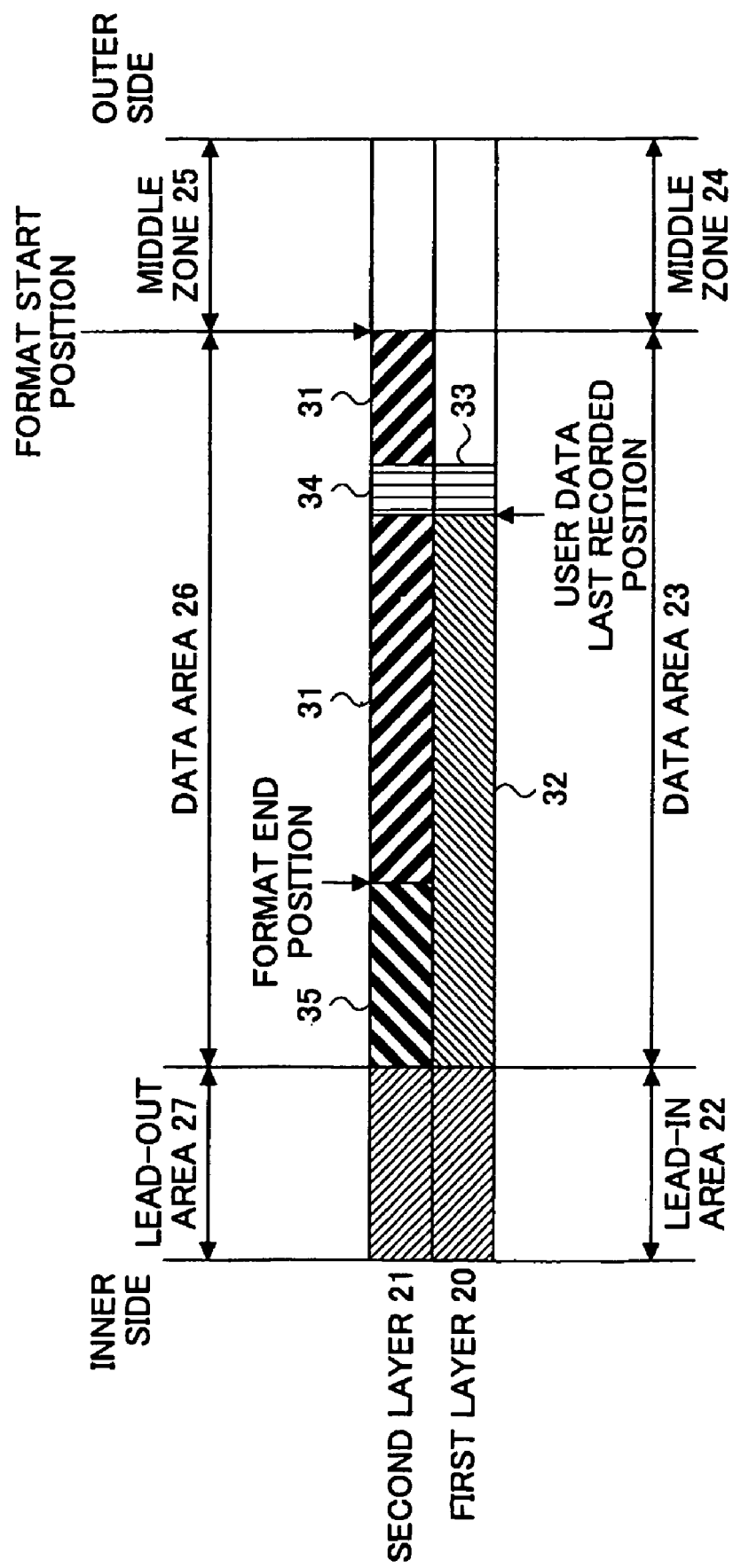
FIG. 7 is an illustration for explaining the disc eject process according to the first embodiment of the present invention performed in the information recording and reproducing apparatus shown in FIG. 3.

FIGS. 5 through 7 are illustrations for explaining a disc eject process according to the first embodiment of the present invention performed in the information recording and reproducing apparatus shown in FIG. 3.

The optical disc 1 comprises a first recording layer 20 and a second recording layer 21 as shown in FIG. 5. The first recording layer 20 includes a lead-in area 22, a data area 23 and a middle zone 24 arranged in that order from an inner side toward an outer side of the optical disc 1. The second recording layer 21 includes a middle zone 25, a data area 26 and a lead-out area 27 arranged in that order from the outer side toward the inner side of the optical disc 1. In FIG. 5, the lead-in area 22 and the lead-out area 27, the data areas 26 and 23, and the middle zones 25 and 24 are located in the same radial positions of the optical disc 1, respectively.

That is, the start address of the lead-in area 22 and the end address of the lead-out area 27, and the end address of the lead-in area 22 and the start address of the lead-out area 27 are in the same radial position of the optical disc 1, respectively. Similarly, the start address of the data area 23 and the end address of the data area 26, and the end address of the data area 23 and the start address of the data area 26 are in the same radial positions, respectively. The start address of the middle zone 24 and the end address of the middle zone 25, and the end address of the middle zone 24 and the end address of the middle zone 25 are in the same radial positions, respectively. The above-mentioned corresponding start addresses and end addresses are at bit inversion values, respectively. It will be appreciated that in an optical disc such as that shown in the figures, two addresses at corresponding radial positions on different recording layers of the disc will be bit inverted with respect to each other. Therefore, it will be appreciated that all references to areas on recording areas on different layers having corresponding radial positions also refer to the areas having bit-inverted addresses.

Upon receipt of a format command from the host computer 11 after the optical disc 1 is loaded, the drive controller 7 records an initial zone 30 of the lead-in area 22. After completion of the recording, the drive controller 7 sends a notification of completion of the formatting to the host computer 11, and, then, receives a disc access for recording or reproduction from the host computer while performing a formatting process of the data areas 23 and 26 at a time when there is no access from the host computer 11. Upon reception of the disc access, the drive controller 7 determines whether or not there is a request of recording user data from the host computer 11. If there is a request of recording user data, recording of user data is performed from the inner side toward the outer side of the data area 23 of the first recording layer.

On the other hand, if there is no request for recording user data, the drive controller determines whether or not there is a request for ejecting the disc. If there is no request for ejecting the disc, the drive controller 7 determines whether or not a formatting process of the second recording layer 21 of the optical disc 1 has been completed with reference to a bitmap recorded in the lead-in area 22. If the formatting process of the second recording layer 21 has not been completed yet, the drive controller 7 starts the formatting process of the data area 26 of the second recording layer 21 from the outer side and continues the formatting process toward the inner side of the optical disc 1.

On the other hand if the formatting process of the second recording layer 21 has been completed, a formatting process of the first recording layer 20 is performed. Here, if user data is not recorded in the data area 23 of the first recording layer 20, the formatting process is started from the start address on the inner side of the data area 23 and continues the formatting process toward the end address on the outer side of the data area 23. If the user data is recorded in a part of the data area 23, the formatting process is started at the last recording position of the user data and continues the formatting process toward the end address.

Then, when a request for ejecting the optical disc 1 out of the host computer 11 is made, and if only the area 31 of the second recording layer 21 is formatted and the formatting is still continuing and user data has been recorded in an area 32 of the first recording layer 20 as shown in FIG. 6, the last recorded position of the user data in the data area 23 and the end position of the formatting in the data area 26 are obtained so as to record data of TMZ in an area 33 immediately after the area 32 of the first recording layer 20 and record data of TMZ in an area 34 in the second recording layer 21. Further, dummy data is recorded in an unrecorded area 35 in the second recording layer 21, and the read-in area 22 and the lead-out area 27 are recorded, and, thereafter, the optical disc 1 is ejected. In other embodiments, only data of TMZ in an area 33 immediately after the area 32 of the first recording layer 20 is recorded, and no data of TMZ is recorded in the second recording layer 21.

As mentioned above, by performing the formatting process of the optical disc from the second recording layer of which recording order of user data is later, a time spent on ejecting the optical disc, when a request for ejecting the optical disc is made in the middle of formatting or in the middle of recording user data, can be shortened, thereby reducing a time for ejecting the optical disc.

Second Embodiment

A description will be given of a second embodiment of the present invention.

Figure 8:
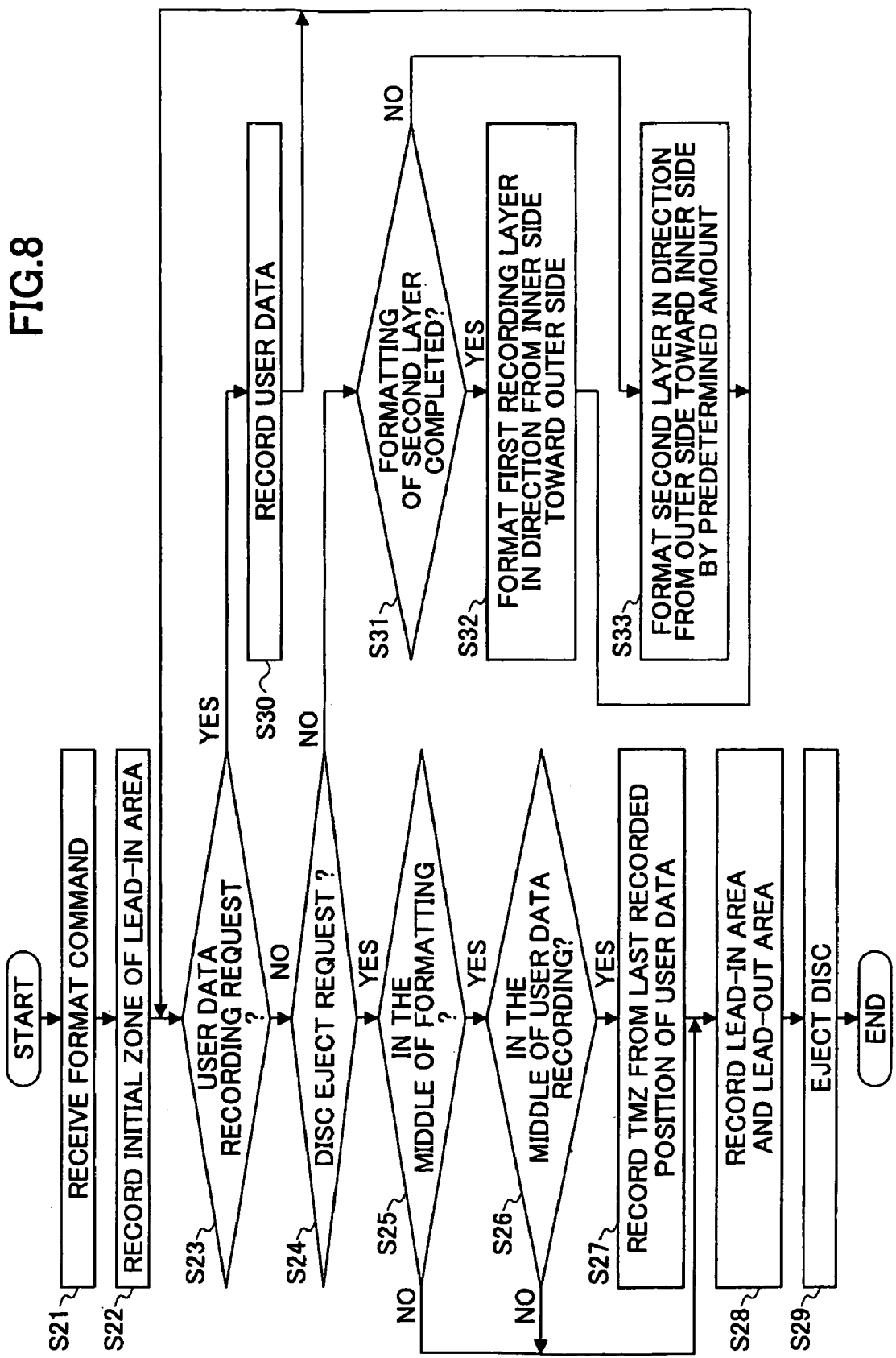
FIG. 8 is a flowchart of a disc eject process according to the second embodiment of the present invention performed in the information recording and reproducing apparatus shown in FIG. 3.

In the second embodiment, the drive controller 7 controls the formatting process of each of the recording layers 20 and 21 of the optical disc 1 to be started from the inner side. FIG. 8 is a flowchart of a disc eject process according to the second embodiment of the present invention performed in the information recording and reproducing apparatus shown in FIG. 3.

Upon receipt of a format command from the host computer 11 after the optical disc 1 is loaded in step S21, the drive controller 7 records, in step S22, an initial zone of the lead-in area of the first recording layer of the optical disc 1. After completion of the recording, the drive controller 7 sends a notification of completion of the formatting to the host computer 11, and, then, receives a request of accessing a disc for recording or reproduction from the host computer 11.

Then, the drive controller 7 determines, in step S23, whether or not there is a request of recording user data from the host computer 11. If there is a request of recording user data, recording of user data received from the host computer 11 is performed, in step S30, from the data area of the first recording layer 20. After the data area of the first recording layer 20 is recorded, the user data is recorded in the data area of the second recording layer 21.

On the other hand, if it is determined, in step S23, that there is no request for recording user data, the drive controller 7 determines, in step S24, whether or not there is a request for ejecting the disc. If it is determined, in step S24, that there is no request for ejecting the disc, the drive controller 7 determines, in step S31, whether or not a formatting process of the second recording layer 21 of the optical disc 1 has been completed.

If it is determined, in step S31, that the formatting process of the data area of the second recording layer has been completed, the routine proceeds to step S32. In step S32, a formatting process of the recording area of the first recording layer is started so as to record data in a direction from the inner side to the outer side of the optical disc 1, and the routine returns to step S23.

If it is determined in step S31 that the formatting process of the data area of the second recording layer has not been completed, the routine proceeds to step S33. In step S33, a formatting process of the recording area of the second recording layer is started so as to record data in a direction from the outer side to the inner side of the optical disc 1 by a predetermined amount of data, and the routine returns to step S33. The predetermined amount of data is a previously set recording unit, and the data is recorded from the outer side to the inner side by the recording unit. That is to say that in step S33, the formatting process on the recording area of the second recording layer is performed in recording increments. Within each recording increment, the formatting is performed along a path from the outer side to the inner side of the recording area of the second recording layer, and the recording increments are along a path from the inner side to the outer side of the recording area.

On the other hand, if it is determined in step S24 that there is a disc eject request from the host computer 11, the routine proceeds to step S25 so as to determine whether or not it is in the middle of formatting (in background). The middle of formatting mentioned here does not mean a state where a formatting process is performed when a determination is made but means a state where a formatting process has not been completed over an entire data area. If it is determined, in step S25, that it is not in the middle of formatting, the routine proceeds to step S28. In step S28, the lead-in area and the lead-out area are recorded. Then, in step S29, the optical disc 1 is ejected, and the process at this time is ended.

If it is determined, in step S25, that it is in the middle of formatting, it is determined, in step S26, whether or not it is in the middle of recording of user data. The middle of recording of user data mentioned here does not mean a state where a user data recording is performed when a determination is made but means a state where a user data recording process has not been completed over an entire area which has not been subjected to a formatting process among the data areas. If it is determined, in step S26, that it is not in the middle of the user data recording, the routine proceeds to step S28. In step S28, the lead-in area and the lead-out area are recorded. Then, in step S29, the optical disc 1 is ejected, and the process at this time is ended.

If it is determined, in step S26, that it is in the middle of the user data recording, the routine proceeds to step S27. In step S27, data of the temporary middle zone (TMZ) is recorded from the last recorded position of the user data. Then, in step S28, the lead-in area and the lead-out area are recorded. Then, in step S29, the optical disc 1 is ejected, and the process at this time is ended.

Figure 9:
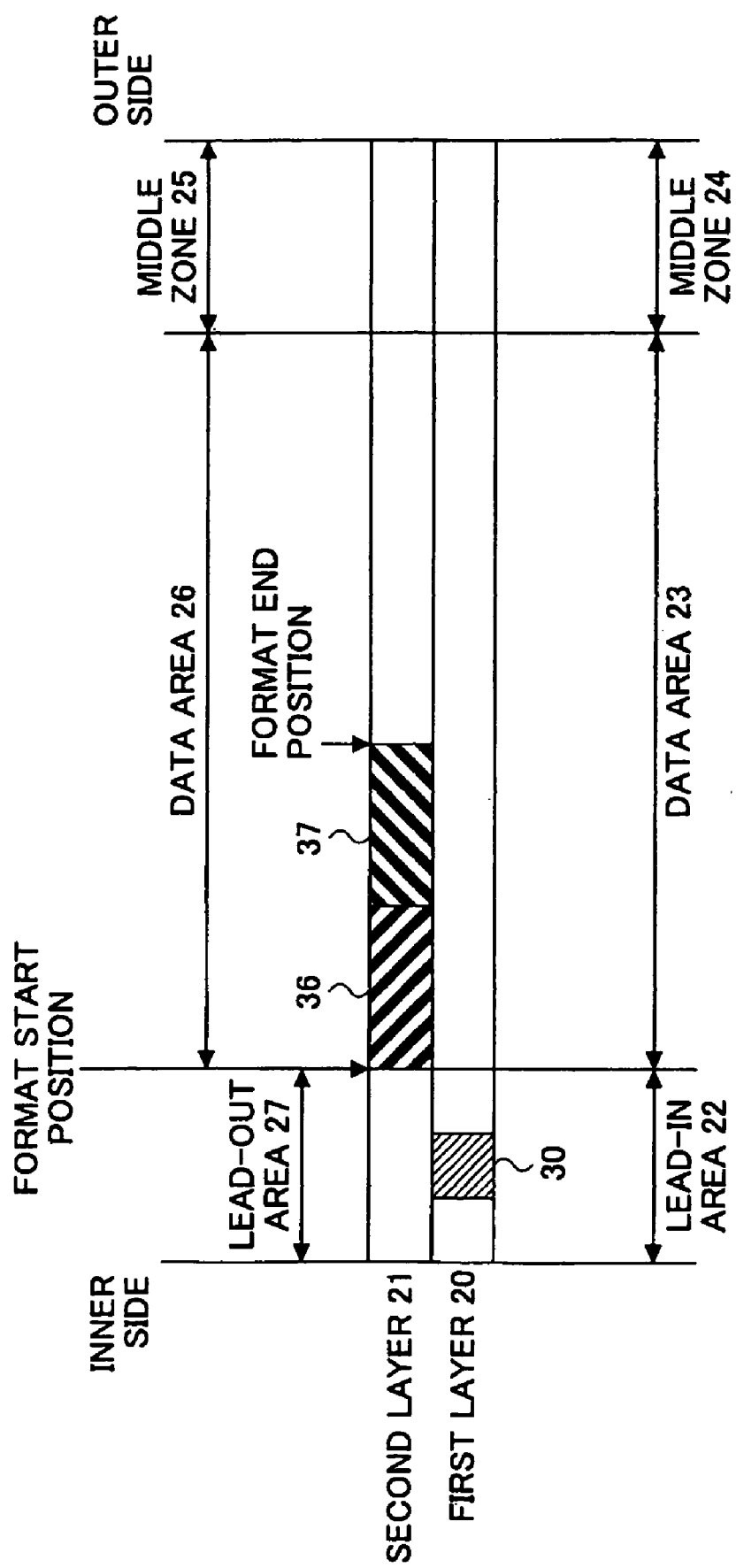
FIG. 9 is an illustration for explaining a disc eject process according to the second embodiment of the present invention performed in the information recording and reproducing apparatus shown in FIG. 3.
Figure 10:
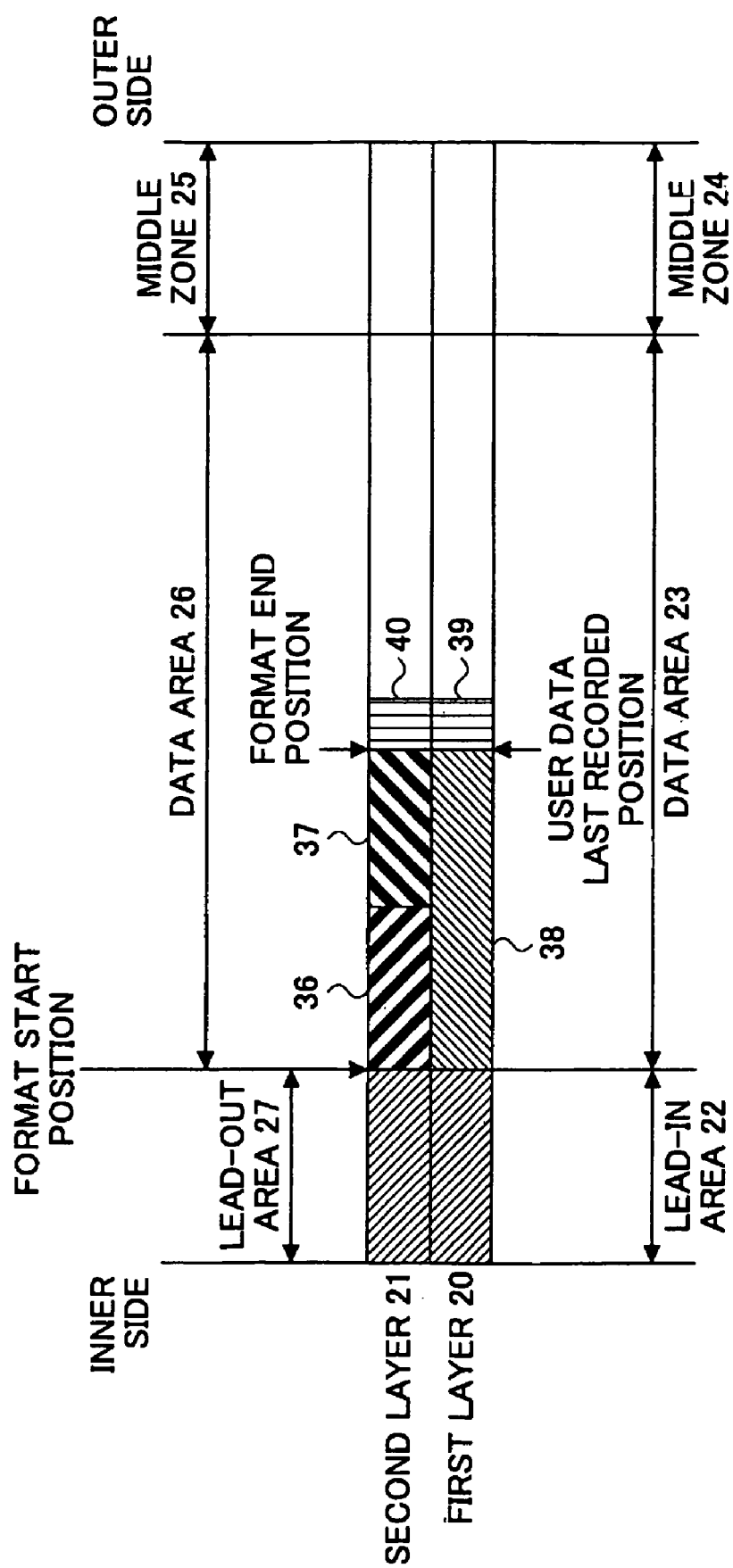
FIG. 10 is an illustration for explaining the disc eject process according to the second embodiment of the present invention in the information recording and reproducing apparatus shown in FIG. 3.

FIG. 9 and FIG. 10 are illustrations for explaining a disc eject process according to the second embodiment of the present invention in the information recording and reproducing apparatus shown in FIG. 3. In FIGS. 9 and 10, parts that are the same as the parts shown in FIGS. 6 through 8 are given the same reference numerals, and description thereof will be omitted.

Upon receipt of a format command from the host computer 11 after the optical disc 1 is loaded, the drive controller 7 records an initial zone 30 of the lead-in area 22 as shown in FIG. 9. After completion of the recording, the drive controller 7 sends a notification of completion of the formatting to the host computer 11, and, then, receives a disc access for recording or reproduction from the host computer 11 while performing a formatting process of the data areas 23 and 26 at a time when there is no access from the host computer 11. Upon reception of the disc access, the drive controller 7 determines whether or not there is a request of recording user data from the host computer 11. If there is a request of recording user data, recording of user data is performed from the inner side toward the outer side of the data area 23 of the first recording layer.

On the other hand, if there is no request for recording user data, the drive controller 7 determines whether or not there is a request for ejecting the disc. If there is no request for ejecting the disc, the drive controller 7 determines whether or not a formatting process of the second recording layer 21 of the optical disc 1 has been completed with reference to a bitmap recorded in the lead-in area 22. If the formatting process of the second recording layer 21 has not been completed yet, the drive controller 7 starts the formatting process of the data area 26 of the second recording layer 21 sequentially in an order of an area 36 and an area of 37, which have the same amount of data, from the outer side and continues the formatting process toward the inner side of the optical disc 1. It should be noted that the formatting process is progressed in each of the area 36 and the area 37 in a direction from the outer side toward the inner side.

On the other hand, if the formatting process of the second recording layer 21 has been completed, a formatting process of the first recording layer 20 is performed in the same manner as mentioned above. Here, if user data is not recorded in the data area 23 of the first recording layer 20, the formatting process is started from the start address on the inner side of the data area 23 and the formatting process is progressed toward the end address on the outer side of the data area 23. If the user data is recorded in a part of the data area 23, the formatting process is started at the last recording position of the user data and the formatting process is progressed toward the end address.

Then, when a request for ejecting the optical disc 1 out of the host computer 11 is made, and if only the areas 36 and 37 of the second recording layer 21 are formatted and the formatting is still continuing and user data has been recorded in an area 38 of the first recording layer 20 and if the last recorded position of the user data and the format end position are at the same radial position of the optical disc as shown in FIG. 10, the last recorded position of the user data in the data area 23 and the end position of the formatting in the data area 26 are obtained. Then, if it is determined that both are at the same radial position, data of TMZ is recorded in an area 39 immediately after the area 38 of the first recording layer 20 and data of TMZ is recorded in an area 40 in the second recording layer 21. It should be noted that the area 39 and the area 40 are at the same radial position. It also should be noted that the addresses of area 39 and the area 40 are bit-inverted with respect to each other. Then, the read-in area 22 and the lead-out area 27 are recorded, and, thereafter, the optical disc 1 is ejected. In other embodiments, data of TMZ is recorded in an area 39 immediately after the area 38 of the first recording layer 20, but no data of TMZ is recorded in the second recording layer 21.

As mentioned above, since the user data is recorded from the inner side of the first recording layer, there is no need to format the entire area of the first and second recording layers if an amount of user data to be recorded is small, and, thereby a time until the optical disc is ejected can be reduced.

Third Embodiment

A description will now be given of a third embodiment of the present invention.

In the third embodiment, the drive controller 7 obtains the last recorded position of the first recording layer of the optical disc 1 in which data has been recorded when an instruction to eject the optical disc 1 is made by the host computer 11. Then, if the drive controller 7 determines that the formatting in the second recording layer has been completed to a position corresponding to the above-mentioned last recorded position, the drive controller 7 controls to eject the optical disc 1 after recording TMZ (corresponding to predetermined data) at a position immediately after the last recorded position in the first recording layer which has the above-mentioned last recorded position, and at a position immediately after the position corresponding to the last recorded position in the second recording layer in which the data has not been recorded.

Figure 11:
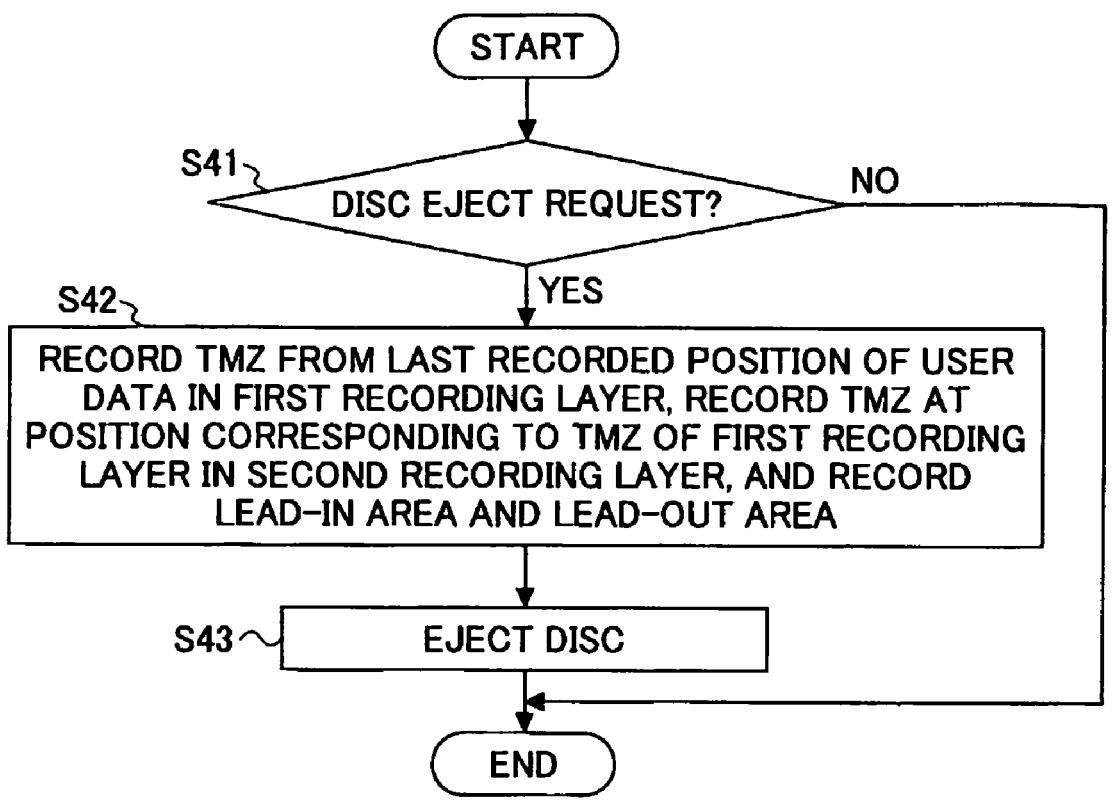
FIG. 11 is a flowchart of a disc eject process according to a third embodiment of the present invention performed in the information recording and reproducing apparatus shown in FIG. 3.

FIG. 11 is a flowchart of a disc eject process according to the third embodiment of the present invention performed in the information recording and reproducing apparatus shown in FIG. 3.

The drive controller 7 determines, in step S41, whether or not there is a disc eject request issued from the host computer 11. If there is no disc eject request, the process is ended. If there is a disc eject request, the drive controller 7 controls, in step S42, to record TMZ in the data area of the first recording layer from the last recorded position, and also record TMZ in the second recording layer at a position corresponding to the position where the TMZ is recorded in the first recording layer, and record the lead-in area and the lead-out area. In other embodiments, a TMZ only needs to be recorded on the first recording layer, and no TMZ is recorded in the second recording layer. Then, the drive controller 7 controls, in step S43, to eject the optical disc 1, and ends the process at this time.

Figure 12:
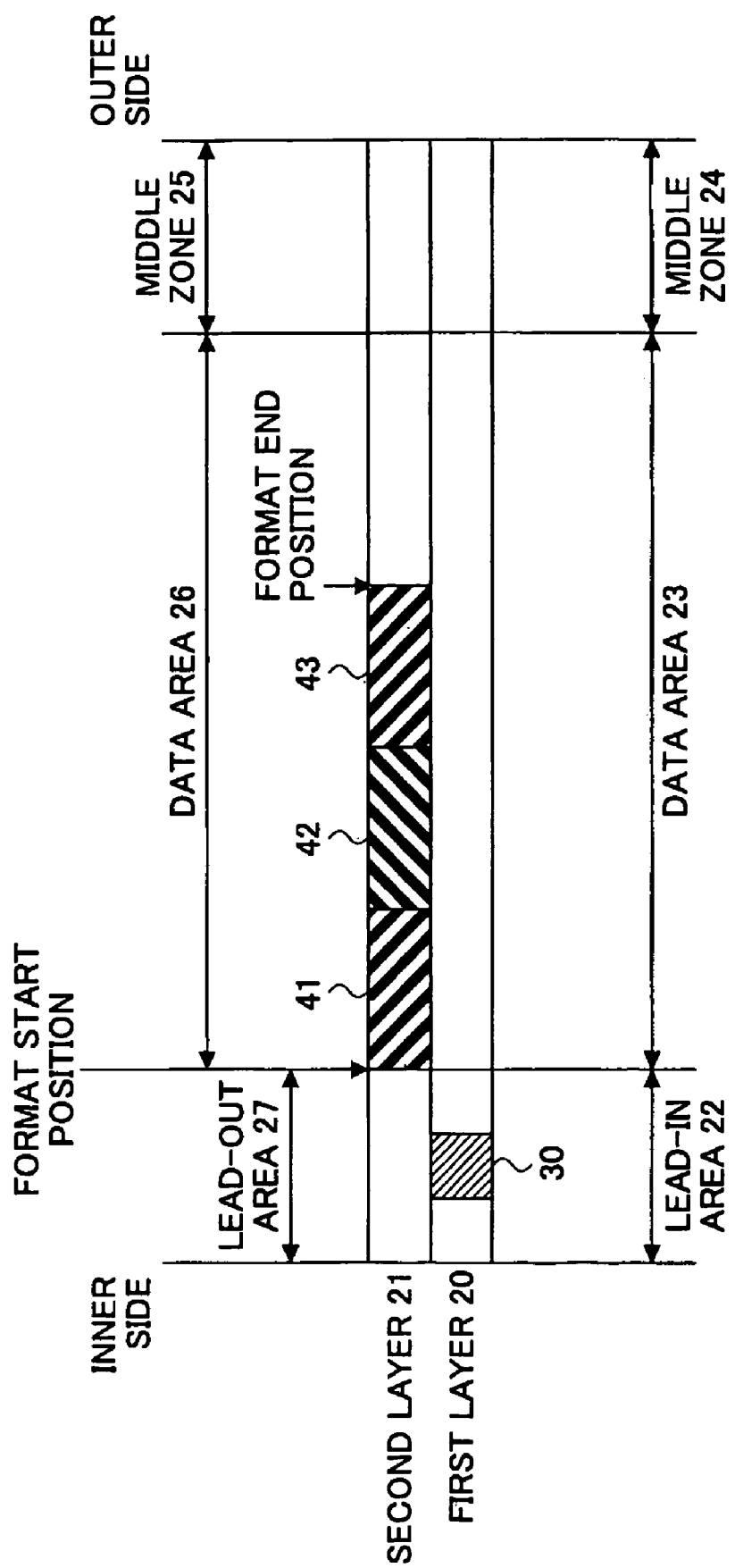
FIG. 12 is an illustration for explaining a disc eject process according to a third embodiment of the present invention performed in the information recording and reproducing apparatus shown in FIG. 3.
Figure 13:
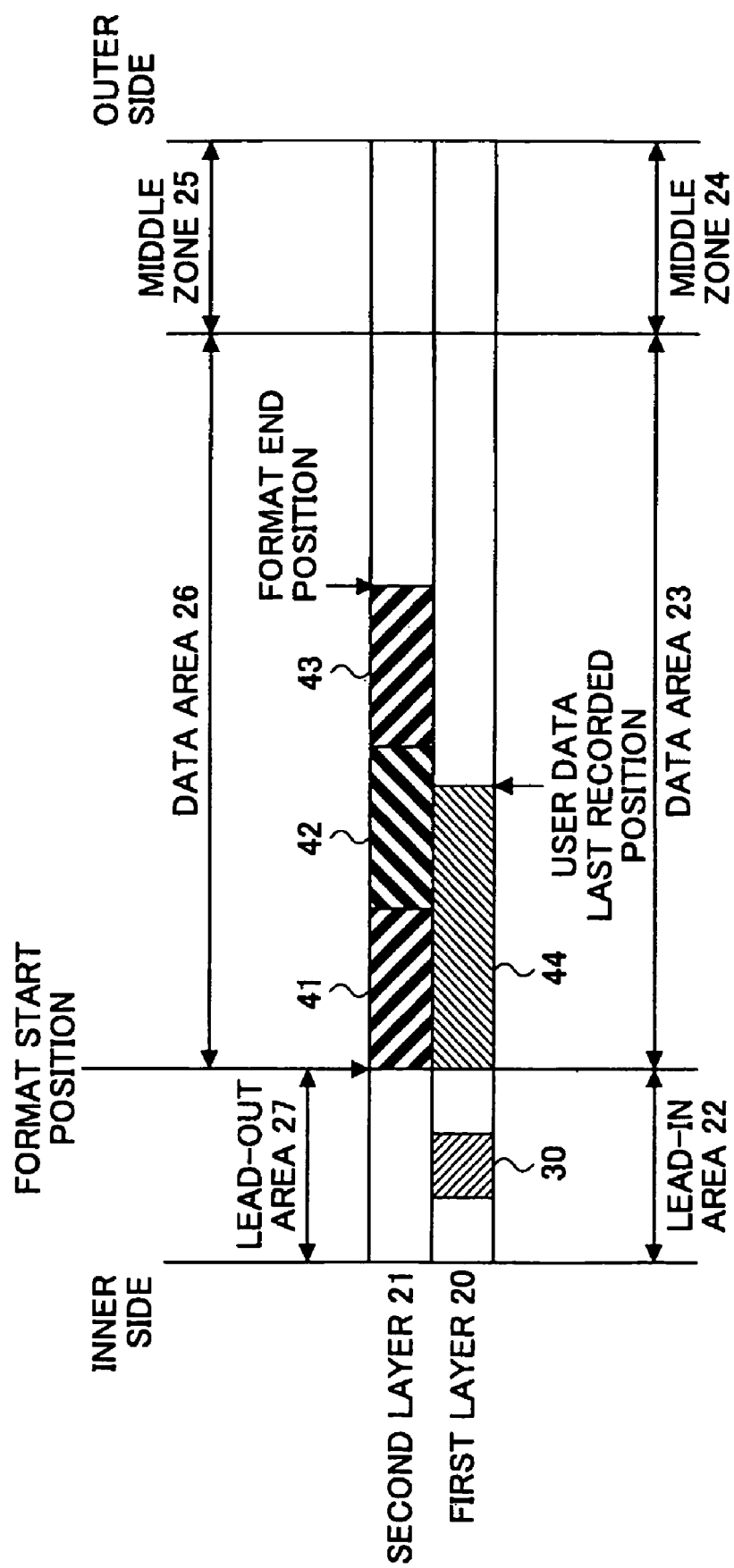
FIG. 13 is an illustration for explaining the disc eject process according to the third embodiment of the present invention performed in the information recording and reproducing apparatus shown in FIG. 3.
Figure 14:
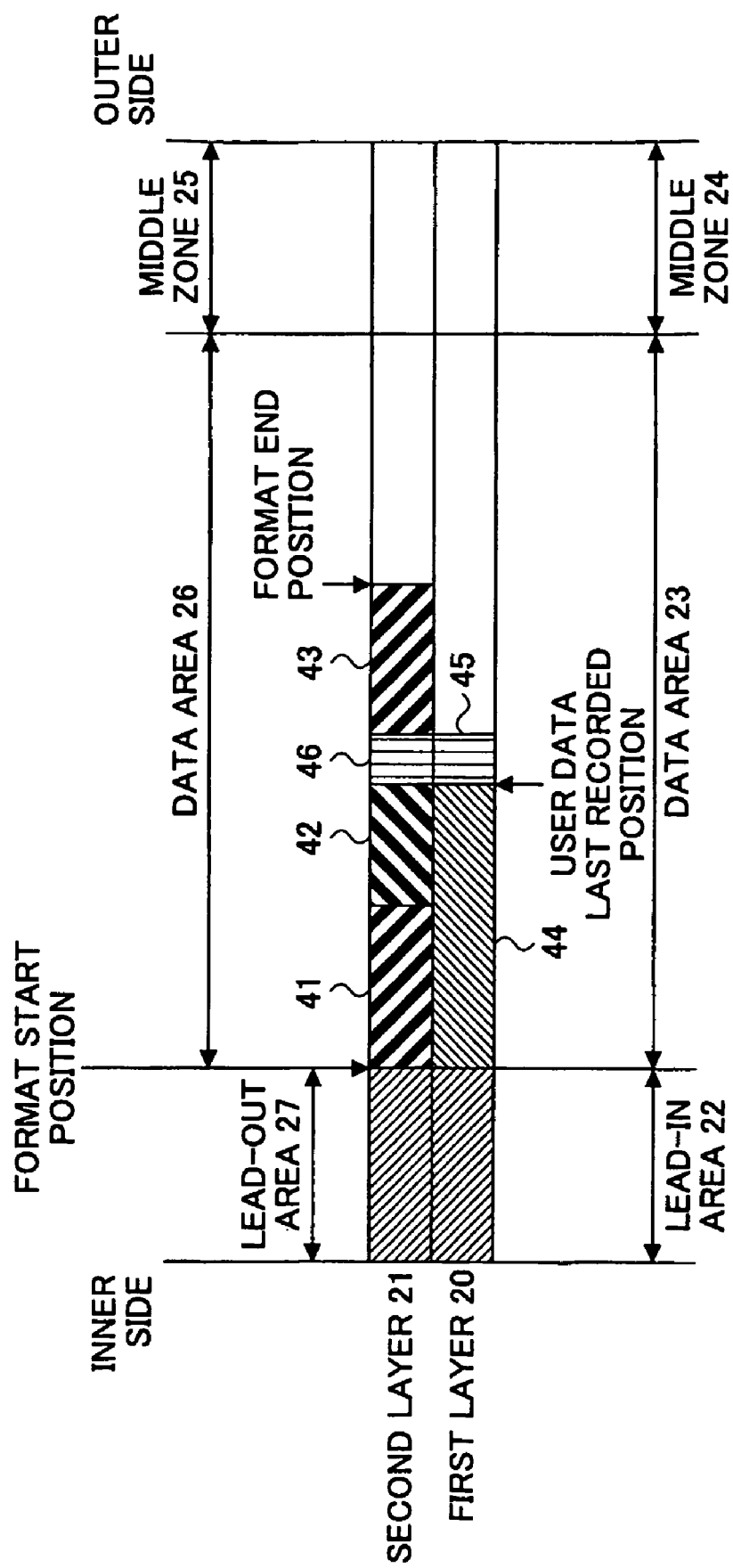
FIG. 14 is an illustration for explaining the disc eject process according to the third embodiment of the present invention performed in the information recording and reproducing apparatus shown in FIG. 3.

FIGS. 12 through 14 are illustrations for explaining the disc eject process according to the third embodiment of the present invention performed in the information recording and reproducing apparatus shown in FIG. 3. In FIGS. 12 through 14, parts that are the same as the parts shown in FIGS. 5 through 7 are given the same reference numerals, and descriptions thereof will be omitted.

If a formatting process of the second recording layer 21 has not been completed yet, the drive controller 7 controls to perform the formatting process on an area 41, an area 42 and an area 43, each of which has the same predetermined capacity and arranged in that order in the data area 26 of the second recording layer 21, sequentially from the inner side toward the outer side as shown in FIG. 12. The areas 41, 42 and 43 are recording increments. The direction of progressing the formatting process in each of the areas 41 to 43 is from the outer side toward the inner side.

Then, when a request of ejecting the optical disc 1 is issued by the host computer 11, the user data last recorded position in the data area 23 and the format end position in the data area 26 are obtained if only the areas 41 through 43 have been formatted and the formatting of the second recording layer 21 has not been completed yet as shown in FIG. 13, the user data is recorded in an area 44 of the first recording layer 20, the user data last recorded position and the format end position are at different positions along a radial direction and an area at the position corresponding to the area 44 in the first recording layer 20 in a radial direction has been formatted. It will be appreciated that if the user data last recorded position and the format end position are at different positions along a radial direction, then they will not be at bit-inverted addresses. Then, if the drive controller 7 determines that the formatting process has been progressed to the position corresponding to the area 44 in the data area 26 in accordance with the both positions, the drive controller 7 controls to record data of TMZ in an area 45 immediately after the area 44 of the first recording layer 20 and also record data of TMZ in an area 46 of the second recording layer 21. The area 45 and the area 46 are at the same position along a radial direction of the optical disc 1 (i.e. at bit-inverted addressed), and, thus, the area 46 is overwritten on the formatted area. In other embodiments, a TMZ need not be recorded in an area 46 of the second recording layer 21. Then, the lead-in area 22 and the lead-out area 27 are recorded, and the optical disc 1 is ejected.

As mentioned above, when a request of ejecting an optical disc is issued to the information recording and reproducing apparatus, and if the format end position of the second recording layer is on the outer side than the user data last recorded position of the first recording layer 1, there is no need to perform dummy data recording from the user data last recorded position of the first recording layer to the formatting start position of the second recording layer, thereby reducing a time to eject the optical disc.

Fourth Embodiment

A description will now be given of a fourth embodiment of the present invention.

In the fourth embodiment, when an instruction of ejecting the optical disc 1 is issued by the host computer 11, the drive controller 7 obtains the last recorded position in the first recording layer 20 of the optical disc 1 in which data is recorded, and also obtains the format end position in the second recording layer in which data is not recorded. Then, if the drive controller 7 determines that an area of the first recording layer from the above-mentioned last recorded position to the above-mentioned format end position is an unrecorded area with respect to the first recording layer having the above-mentioned last recorded position, the drive controller 7 controls to record dummy data in the area from the above-mentioned last recorded position to the above-mentioned format end position with respect to the first recording layer having the last recorded position, and, record TMZ (corresponding to predetermined data) immediately after the recorded dummy data in the first recording layer and immediately after the format end position in the second recording layer, and, thereafter eject the optical disc 1.

Figure 15:
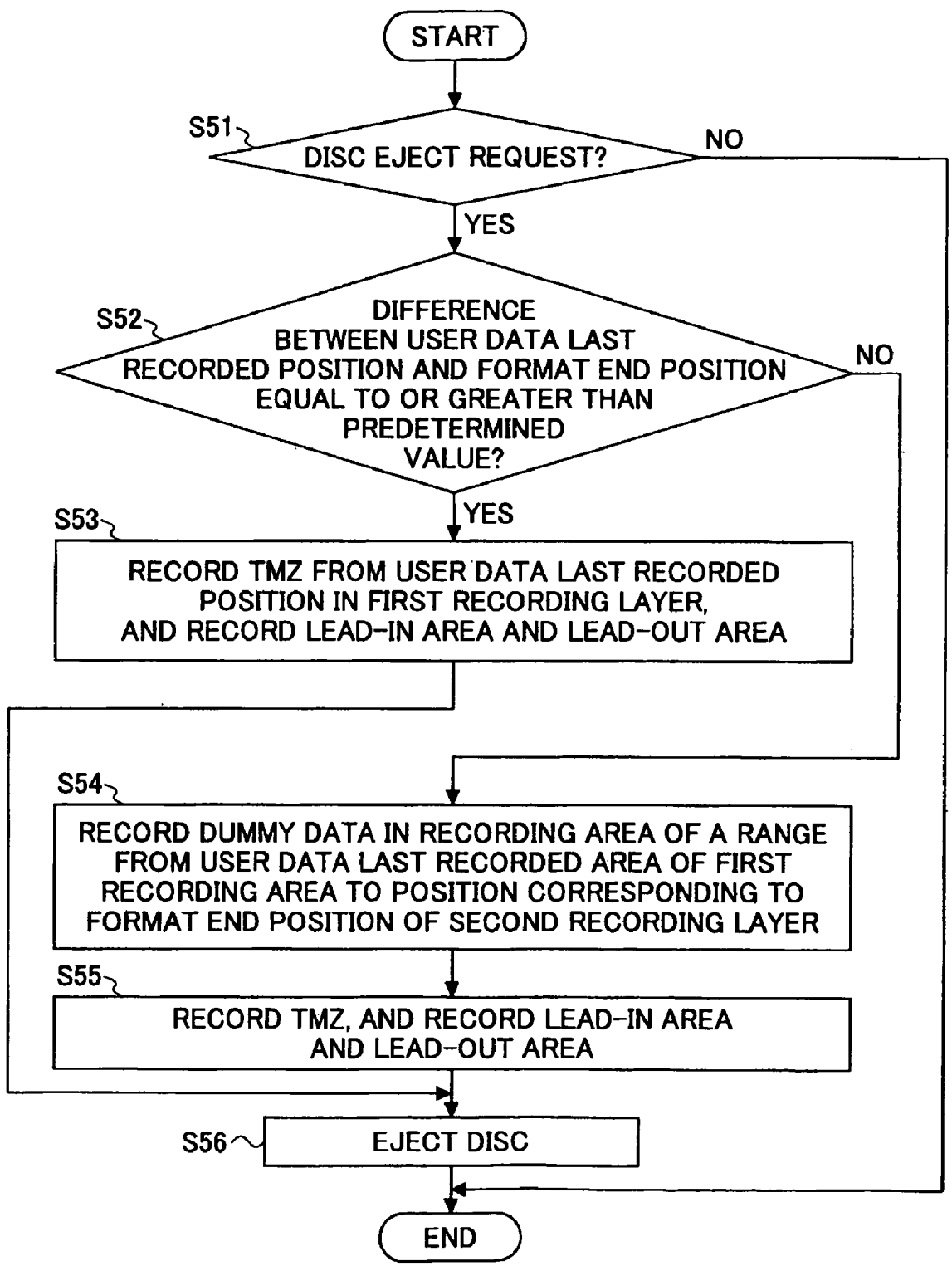
FIG. 15 is a flowchart of a disc eject process according to the fourth embodiment of the present invention performed in the information recording and reproducing apparatus shown in FIG. 3.

FIG. 15 is a flowchart of a disc eject process according to the fourth embodiment of the present invention performed in the information recording and reproducing apparatus shown in FIG. 3.

The drive controller 7 determines, in step S51, whether or not there is a disc eject request issued from the host computer 11. If there is no disc eject request, then, the process at this time is ended. If there is a disc eject request, the drive controller 7 determines, in step S52, whether or not a difference between the user data last recorded position in the first recording area and the format end position in the second recording layer is equal to or greater than a predetermined value. The predetermined value is preferably set to, for example, 4,400 sectors which correspond to the length of the middle zone.

If it is determined, in step S52, that the difference between the user data end recorded position and the format end position is equal to or greater than the predetermined value, TMZ is recorded, in step S53, from the user data last recorded position in the data area of the first recording layer, and the lead-in area and the lead-out area are recorded. Then, the optical disc 1 is ejected in step S56, and, then, the process at this time is ended.

If it is determined, in step S52, that the difference between the user data end recorded position and the format end position is not equal to or greater than the predetermined value (less than the predetermined value), the routine proceeds to step S54. In step S54, dummy data is recorded in a recording area of a range from the user data last recorded position in the data area of the first recording layer to a position corresponding to the format end position of the data area of the second recording layer (a position in the first recording layer at the same position in a radial direction as the format end position of the second recording layer, i.e. at the bit-inverted address). Then, in step S55, TMZ is recorded and the lead-in area and the lead-out area are recorded. Thereafter, the optical disc 1 is ejected in step S56, and the process at this time is ended. In S55, the TMZ could be recorded only the data area of the first recording or on the data areas of both the first and second recording layers.

Figure 16:
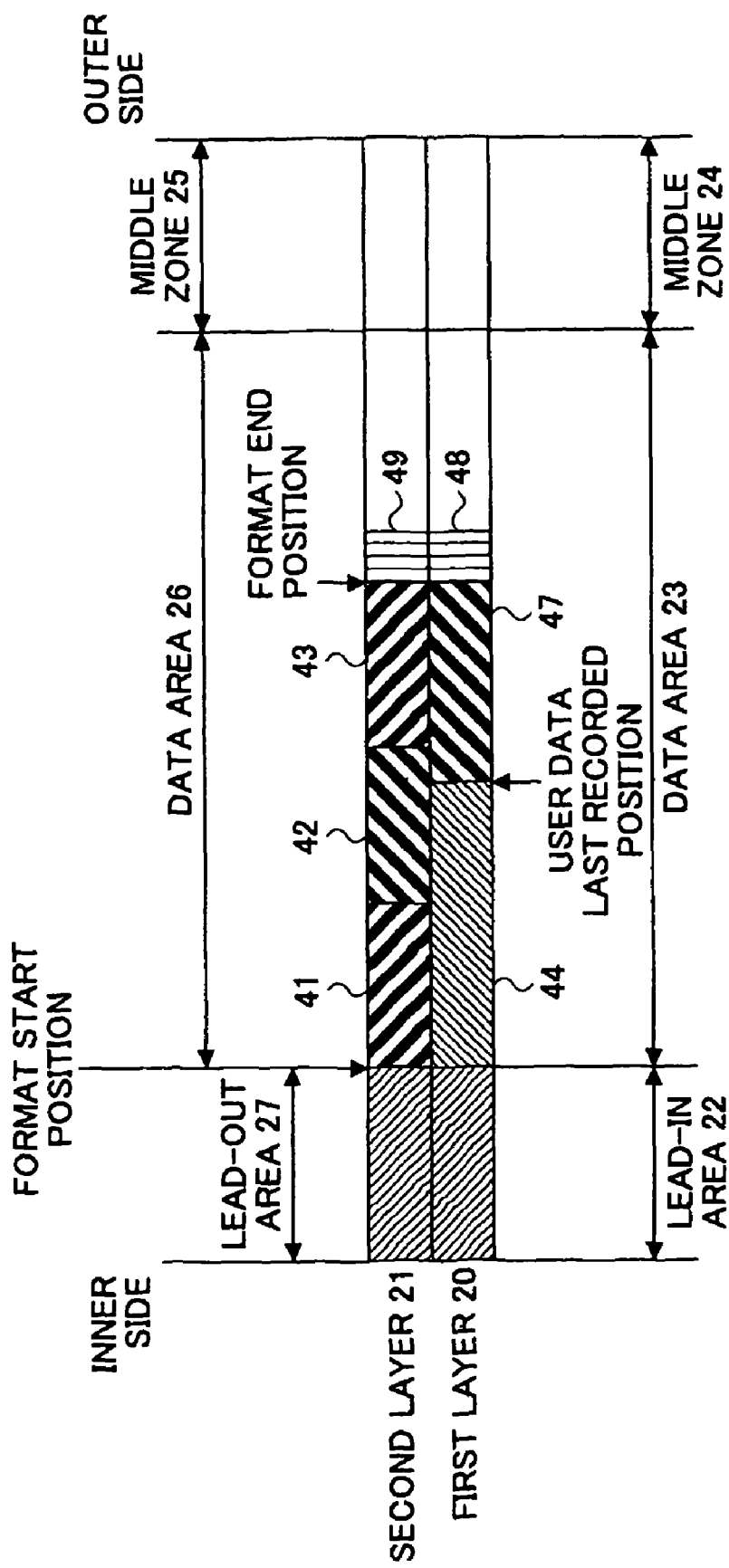
FIG. 16 is an illustration for explaining the disc eject process according to the fourth embodiment of the present invention performed in the information recording and reproducing apparatus shown in FIG. 3.

FIG. 16 is an illustration for explaining the disc eject process according to the fourth embodiment of the present invention performed in the information recording and reproducing apparatus shown in FIG. 3. In FIG. 16, parts that are the same as the parts shown in FIGS. 12 through 14 are given the same reference numerals, and descriptions thereof will be omitted.

The user data last recorded position in the data area 23 and the format end position in the data area 26 are obtained if only the areas 41 through 43 of the second recording layer 21 have been formatted and the user data is recorded in the area 44 of the first recording layer 20 and the user data last recorded position and the format end position are at different positions along a radial direction and an area at the position corresponding to the area 44 in the first recording layer 20 in a radial direction has been formatted. Then, the drive controller 7 compares the both positions and if it is determined that an unrecorded area 47 corresponding to a difference therebetween is less than the length of the middle zone (for example, 4,400 sectors), the drive controller 7 controls to record dummy data in the unrecorded area 47 and also records the data of TMZ in an area 48 immediately after the unrecorded area 47 and an are 49 immediately before the recording area 43 of the second recording layer 21. Then, after the lead-in area 22 and the lead-out area 27 are recorded, the optical disc 1 is ejected.

On the other hand, if the drive controller 7 determines that the unrecorded area 47 is equal to or longer than the length of the middle zone, the data of TMZ is recorded in the area immediately after the area 44 of the first recording layer 21 and the area of the same position in a radial direction in the second recording layer 21, and the lead-in area 22 and the lead-out area 27 are recorded, and the optical disc 1 is ejected.

It should be noted that, in the above-mentioned process, if it is determined that the length of the formatted area (areas 41 to 43) is shorter than the length of the area 44 already recorded in the data area 23 based on the user data last recorded position in the data area 23 and the format end position of the data area 26, dummy data may be recorded in the unrecorded area 47 corresponding to the difference between the user data last recorded position in the data area 23 and the position in the first recording layer 20 corresponding to the format end position, and the data of TMZ is recorded in the area 49 immediately before the recording area 43 of the second recording layer 21, and the lead-in area 22 and the lead-out area 27 are recorded and, thereafter, the optical disc 1 is ejected.

As mentioned above, if the format end position of the second recording layer and the user data last recorded position of the first recording layer are not at the same position along a radial direction of the optical disc 1, the unrecorded area of the first recording area is caused to be already recorded in response to the formatted area of the second recording layer. Thus, the formatted area of the second recording layer can be recognized as an already formatted area even after the optical disc is ejected, and, thereby, the formatting process of the second recording layer is not wasted.

It should be noted that the data of the temporary middle zone (TMZ) recorded when ejecting the dual-layer DVD+RW disc in the above-mentioned embodiments may be dummy data.

Additionally, although the case of the optical disc having two recording layers was explained in the above embodiments, the present invention is applicable to an optical disc having more than two recording layers in the same manner.

The information recording and reproducing apparatus according to the present invention is used with a recording medium having a plurality of recording layers that is detachably attached thereto, and the present invention is applicable to an apparatus that performs recording and reproduction on such a recording medium.

The present invention is not limited to the specifically disclosed embodiments, and variations and modifications may be made without departing from the scope of the present invention.

The present application is based on Japanese priority application No. 2005-071456 filed Mar. 14, 2005, the entire contents of which are hereby incorporated herein by reference.

The invention claimed is:

1. A method for recording information to a recording medium having at least a first recording layer and a second recording layer, the first recording layer having a data area comprising an inner side located at a radially inner region of the recording medium and an outer side located at a radially outer region of the recording medium and the second recording layer comprising a data area including an inner side located at the radially inner region of the recording medium and an outer side located at the radially outer region of the recording medium, the method comprising:
performing a first formatting process on the data area of the second recording layer, said first formatting process comprising formatting said data area of the second recording layer in a series of recording increments, the series of recording increments progressing from the inner side of the data area of the second recording layer to the outer side of the data area of the second recording layer, wherein within each recording increment the formatting is performed along a path extending from the outer side of the data area of the second recording layer to the inner side of the data area of the second recording layer;
performing a second formatting process on the data area of the first recording layer once the first formatting process has been completed, the second formatting process being performed along a path extending from the inner side of the data area of the first recording layer to the outer side of the data area of the first recording layer.

2. A method according to claim 1, wherein the recording medium is adapted to be recorded using a laser, and the first recording layer is the recording layer closest to the laser during use.

3. A method according to claim 1, wherein the recording medium is associated with an order of recording user data for each recording layer, and the first recording layer is arranged to be earlier in the recording order than the second recording layer.

4. A method according to claim 3, further comprising recording user data on a data area of the first recording layer along a path extending from the inner side of the data area of the first recording layer to the outer side of the data area of the first recording layer on receipt of a request to record user data.

5. A method according to claim 4, wherein on receiving a request to record user data, the method comprises recording the user data in priority to the performing the first formatting process or the second formatting process.

6. A method according to claim 4, further comprising resuming the first formatting process after recording the user data if the first formatting process is not complete.

7. A method according to claim 4, further comprising resuming the second formatting process after recording the user data if the first formatting process is complete.

8. A method according to claim 4, further comprising: recording predetermined data on the first recording layer at a position immediately after recorded user data on receipt of a request to eject the recording medium.

9. A method according to claim 8, further comprising: recording predetermined data on the second recording layer at a corresponding radial position to the predetermined data on the first recording layer.

10. A method according to claim 8, further comprising: recording predetermined data on the second recording layer at the bit inverted addresses to the addresses of the predetermined data on the first recording layer.

11. A method according to claim 4, wherein on receipt of a request to eject the recording medium, if an end position of the user data on the first recording layer is further in the radially outer direction of the recording medium than an end position of formatted data on the second recording layer, then the method further comprises: performing a formatting process on the data area of the second recording layer so as to make the radial position of the end position of formatted data on the second recording layer correspond to the radial position of the end position of the user data on the first recording layer.

12. A method according to claim 4, wherein on receipt of a request to eject the recording medium, if an end position of the recording of the user data on the first recording layer is further in the radially outer direction of the recording medium than an end position of formatted data on the second recording layer, then the method further comprises: performing a formatting process on the data area of the second recording layer so as to make the address of the end position of formatted data on the second recording layer be the bit inverted address of the address of the end position of the user data on the first recording layer.

13. A method according to claim 1, wherein on receipt of a request to eject the recording medium, the method further comprises: obtaining a last recorded position of data on said recording medium; recording, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and ejecting said recording medium after recording the predetermined data.

14. A method according to claim 1, wherein on receipt of a request to eject the recording medium, the method further comprises: obtaining a last recorded position of data on said recording medium; obtaining a format end position of each recording layer in which the data is not recorded yet; recording dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position; recording predetermined data at a position immediately after the recorded dummy data in each recording layer having said last recorded position of the data, at a position immediately after said format end position in the recording layer having said format end position, and at a position corresponding to said format end position in each recording layer in which data is not recorded yet and formatting has completed; and ejecting said recording medium after recording the predetermined data.

15. A method according to claim 1, wherein the recording medium is an optical disk.

16. An information recording apparatus, comprising:
a signal control circuit, a drive controller, and a buffer memory, and
wherein said apparatus is arranged to record data on a recording medium having at least a first recording layer and a second recording layer, the first recording layer having a data area comprising an inner side located at a radially inner region of the recording medium and an outer side located at a radially outer region of the recording medium and the second recording layer comprising a data area including an inner side located at the radially inner region of the recording medium and an outer side located at the radially outer region of the recording medium; and
wherein the apparatus is arranged to: format the data area of the second recording layer of the recording medium according to a first formatting process, said first formatting process comprising formatting said data area of the second recording layer in a series of recording increments, the series of recording increments progressing from the inner side of the data area of the second recording layer to the outer side of the data area of the second recording layer, wherein within each recording increment the formatting is performed along a path extending from the outer side of the data area of the second recording layer to the inner side of the data area of the second recording layer; and format a data area of the first recording layer of the recording medium according to a second formatting process once the first formatting process has been completed, the second formatting process being along a path extending from the inner side of the data area of the first recording layer to the outer side of the data area of the first recording layer.

17. An information recording apparatus according to claim 16, wherein the apparatus is adapted to record data on the recording medium using a laser, wherein the first recording layer is the recording layer closest to the laser during use.

18. An information recording apparatus according to claim 16, wherein the recording medium is associated with an order of recording user data for each recording layer, and the first recording layer is arranged to be earlier in the recording order than the second recording layer.

19. An information recording apparatus according to claim 16, wherein the apparatus is further arranged to record user data on a data area of the first recording layer along a path extending from the inner side of the data area of the first recording layer to the outer side of the data area of the first recording layer on receipt of a request to record user data.

20. An information recording apparatus according to claim 19, wherein on receipt of a request to record user data, the apparatus is further arranged to record the user data in priority to the performing the first formatting process.

21. An information recording apparatus according to claim 19, wherein the apparatus is further arranged to resume performing the first formatting process after recording the user data if the first formatting process is not complete.

22. An information recording apparatus according to claim 19, wherein the apparatus is further arranged to resume performing the second formatting process after recording the user data if the first formatting process is complete.

23. An information recording apparatus according to claim 19, wherein the apparatus is further arranged to record predetermined data on the first recording layer at a position immediately after recorded user data on receipt of a request to eject the recording medium.

24. An information recording apparatus according to claim 23, wherein the apparatus is further arranged to record predetermined data on the second recording layer at a corresponding radial position to the predetermined data on the first recording layer.

25. An information recording apparatus according to claim 23, wherein the apparatus is further arranged to record predetermined data on the second recording layer at the bit inverted addresses to the addresses of the predetermined data on the first recording layer.

26. An information recording apparatus according to claim 16, wherein the apparatus is further arranged such that on receipt of a request to eject the recording medium, if an end position of the recording of the user data on the first recording layer is further in the radially outer direction of the recording medium than an end position of formatted data on the second recording layer, then the apparatus is further arranged to: format the data area of the second recording layer so as to make the radial position of the end position of formatted data on the second recording layer correspond to the radial position of the end position of the user data on the first recording layer.

27. An information recording apparatus according to claim 16, wherein the apparatus is further arranged such that on receipt of a request to eject the recording medium, if an end position of the recording of the user data on the first recording layer is further in the radially outer direction of the recording medium than an end position of formatted data on the second recording layer, then the apparatus is further arranged to: format the data area of the second recording layer so as to make the address of the end position of formatted data on the second recording layer be the bit inverted address to the address of the end position of the user data on the first recording layer.

28. An information recording apparatus according to claim 16, wherein on receipt of a request to eject the recording medium, the apparatus is adapted to: obtain a last recorded position of data on said recording medium; record, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and eject said recording medium after recording the predetermined data.

29. An information recording apparatus according to claim 16, wherein on receipt of a request to eject the recording medium, the apparatus is adapted to: obtain a last recorded position of data on said recording medium; obtain a format end position of each recording layer in which the data is not recorded yet; record dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position; record predetermined data at a position immediately after the recorded dummy data in each recording layer having said last recorded position of the data, at a position immediately after said format end position in the recording layer having said format end position, and at a position corresponding to said format end position in each recording layer in which data is not recorded yet and formatting has completed; and eject said recording medium after recording the predetermined data.

30. An information recording apparatus according to claim 16, wherein the recording medium is an optical disk.

31. An information recording and reproducing apparatus configured and arranged to record data on and reproduce data from each of a plurality of recording layers of a recording medium, comprising:
a controller that controls a formatting process to format said recording medium by starting from one of the recording layers of which recording order of data is latest and progressing the formatting from one of the recording layers of which the recording order is later toward one of the recording layers of which the recording order is earlier, wherein said controller controls an eject process to eject said recording medium from said information recording and reproducing apparatus so as to obtain a last recorded position of data on said recording medium when an instruction of ejecting said recording medium is made; record, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and eject said recording medium after recording the predetermined data.

32. An information recording and reproducing apparatus configured and arranged to record data on and reproduce data from each of a plurality of recording layers of a recording medium, comprising:
a controller that controls a formatting process to format said recording medium by starting from one of the recording layers of which recording order of data is latest and progressing the formatting from one of the recording layers of which the recording order is later toward one of the recording layers of which the recording order is earlier, wherein said controller controls an eject process to eject said recording medium from said information recording and reproducing apparatus so as to obtain a last recorded position of data on said recording medium when an instruction of ejecting said recording medium is made; obtain a format end position of each recording layer in which the data is not recorded yet; record dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position; record predetermined data at a position immediately after the recorded dummy data in each the recording layer having said last recorded position of the data, at a position immediately after said format end position in the recording layer having said format end position, and at a position corresponding to said format end position in each recording layer in which data is not recorded yet and formatting has completed; and eject said recording medium after recording the predetermined data.

33. An information recording and reproducing apparatus configured and arranged to record data on and reproduce data from each of a plurality of recording layers of a recording medium, comprising:
formatting means for formatting said recording medium by starting from one of the recording layers of which recording order of data is latest and progressing the formatting from one of the recording layers of which the recording order is later toward one of the recording layers of which the recording order is earlier, and further comprising:
means for obtaining a last recorded position of data on said recording medium when an instruction of ejecting said recording medium is made;
means for recording, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and
means for ejecting said recording medium after recording the predetermined data.

34. An information recording and reproducing apparatus configured and arranged to record data on and reproduce data from each of a plurality of recording layers of a recording medium, comprising:
formatting means for formatting said recording medium by starting from one of the recording layers of which recording order of data is latest and progressing the formatting from one of the recording layers of which the recording order is later toward one of the recording layers of which the recording order is earlier, and further comprising:
means for obtaining a last recorded position of data on said recording medium when an instruction of ejecting said recording medium is made;
means for obtaining a format end position of each recording layer in which the data is not recorded yet;
means for recording dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position;
means for recording predetermined data at a position immediately after the recorded dummy data in each the recording layer having said last recorded position of the data, at a position immediately after said format end position in the recording layer having said format end position, and at a position corresponding to said format end position in each recording layer in which data is not recorded yet and formatting has completed; and means for ejecting said recording medium after recording the predetermined data.

35. A method of controlling an information recording and reproducing apparatus configured and arranged to record data on and reproduce data from each of a plurality of recording layers of a recording medium, the method comprising:

a formatting step of formatting said recording medium by starting from one of the recording layers of which recording order of data is latest and progressing the formatting from one of the recording layers of which the recording order is later toward one of the recording layers of which the recording order is earlier, and further comprising:

a step of obtaining a last recorded position of data on said recording medium when an instruction of ejecting said recording medium is made;

a step of recording, when formatting has been completed to a position of each recording layer corresponding to said last recorded area, predetermined data at a position immediately after said last recorded position in the recording layer having said last recorded position and at a position immediately after a position corresponding to said last recorded position in each recording layer in which the data is not recorded; and a step of ejecting said recording medium after recording the predetermined data.

36. A method of controlling an information recording and reproducing apparatus configured and arranged to record data on and reproduce data from each of a plurality of recording layers of a recording medium, the method comprising:

a formatting step of formatting said recording medium by starting from one of the recording layers of which recording order of data is latest and progressing the formatting from one of the recording layers of which the recording order is later toward one of the recording layers of which the recording order is earlier, and further comprising:

a step of obtaining a last recorded position of data on said recording medium when an instruction of ejecting said recording medium is made;

a step of obtaining a format end position of each recording layer in which the data is not recorded yet;

a step of recording dummy data, when an area from said last recorded position to a position corresponding to said format end position is an unrecorded area with respect to one of the recording layers having said last recorded position of the data in accordance with said last recorded position and said format end position, the dummy data being recorded in the area from said last recorded position to the position corresponding to said format end position;

a step of recording predetermined data at a position immediately after the recorded dummy data in each the recording layer having said last recorded position of the data, at a position immediately after said format end position in the recording layer having said format end position, and at a position corresponding to said format end position in each recording layer in which data is not recorded yet and formatting has completed; and a step of ejecting said recording medium after recording the predetermined data.

* * * * *